United States Patent
Ishizuka et al.

(10) Patent No.: US 11,826,902 B2
(45) Date of Patent: Nov. 28, 2023

(54) ROBOT SYSTEM AND METHOD FOR CONTROLLING ROBOT

(71) Applicant: HONDA MOTOR CO., LTD., Tokyo (JP)

(72) Inventors: Yasutaka Ishizuka, Tochigi-ken (JP); Takeshi Arimitsu, Tochigi-ken (JP); Kasane Goda, Tochigi-ken (JP); Yutaka Yoshida, Tochigi-ken (JP); Kotaro Muraoka, Tochigi-ken (JP)

(73) Assignee: HONDA MOTOR CO., LTD., Tokyo (JP)

( * ) Notice: Subject to any disclaimer, the term of this patent is extended or adjusted under 35 U.S.C. 154(b) by 787 days.

(21) Appl. No.: 16/965,649

(22) PCT Filed: Nov. 27, 2018

(86) PCT No.: PCT/JP2018/043604
§ 371 (c)(1),
(2) Date: Jul. 29, 2020

(87) PCT Pub. No.: WO2019/150726
PCT Pub. Date: Aug. 8, 2019

(65) Prior Publication Data
US 2021/0039264 A1    Feb. 11, 2021

(30) Foreign Application Priority Data
Feb. 1, 2018    (JP) .................................. 2018-016084

(51) Int. Cl.
*B25J 13/08*    (2006.01)
*B25J 9/16*    (2006.01)
(Continued)

(52) U.S. Cl.
CPC ............. *B25J 13/084* (2013.01); *B25J 9/163* (2013.01); *B25J 9/1687* (2013.01); *B25J 15/0019* (2013.01); *B25J 19/063* (2013.01)

(58) Field of Classification Search
CPC ........ B25J 9/163; B25J 9/1687; B25J 13/084; B25J 15/0019; B25J 19/063
See application file for complete search history.

(56) References Cited

U.S. PATENT DOCUMENTS

| 2011/0208356 A1 | 8/2011 | Kato et al. |
| 2015/0234375 A1 | 8/2015 | Takayama |

(Continued)

FOREIGN PATENT DOCUMENTS

| JP | 4850956 | 1/2012 |
| JP | 2015-155126 | 8/2015 |

(Continued)

OTHER PUBLICATIONS

International Search Report and Written Opinion for International Application No. PCT/JP2018/043604 dated Mar. 5, 2019, 9 pages.

Primary Examiner — Nicholas Kiswanto
(74) Attorney, Agent, or Firm — AMIN, TUROCY & WATSON, LLP

(57) ABSTRACT

A robot system and method for controlling a robot, wherein during learning, a detection unit detects, as waveform data for learning, the contact state when a socket is caused to contact a set position of the head of a bolt and is caused to rotate around the set position within a set movement range. A learning unit learns a plurality of detected sets of the waveform data for learning and writes the learning results to a determination unit. During practical operations, the determination unit recognizes the amount that the socket slips with respect to the bolt on the basis of actual waveform data indicating the change in the contact state when the socket is (Continued)

in contact with the head of the bolt and the written learning results.

8 Claims, 23 Drawing Sheets

(51) Int. Cl.
  *B25J 15/00* (2006.01)
  *B25J 19/06* (2006.01)

(56) References Cited

U.S. PATENT DOCUMENTS

| | | |
|---|---|---|
| 2015/0251312 A1 | 9/2015 | Suzuki et al. |
| 2016/0039092 A1 | 2/2016 | Tarada et al. |
| 2017/0028521 A1 | 2/2017 | Yamamoto |
| 2017/0144301 A1 | 5/2017 | Washizu et al. |
| 2018/0354125 A1* | 12/2018 | Ueda .................... G05B 19/425 |
| 2020/0039088 A1* | 2/2020 | Graul .................... B25J 15/0019 |

FOREIGN PATENT DOCUMENTS

| | | |
|---|---|---|
| JP | 5824354 | 11/2015 |
| JP | 5890488 | 3/2016 |
| JP | 6006256 | 10/2016 |
| JP | 2017-030088 | 2/2017 |
| JP | 2017-094438 | 6/2017 |

* cited by examiner

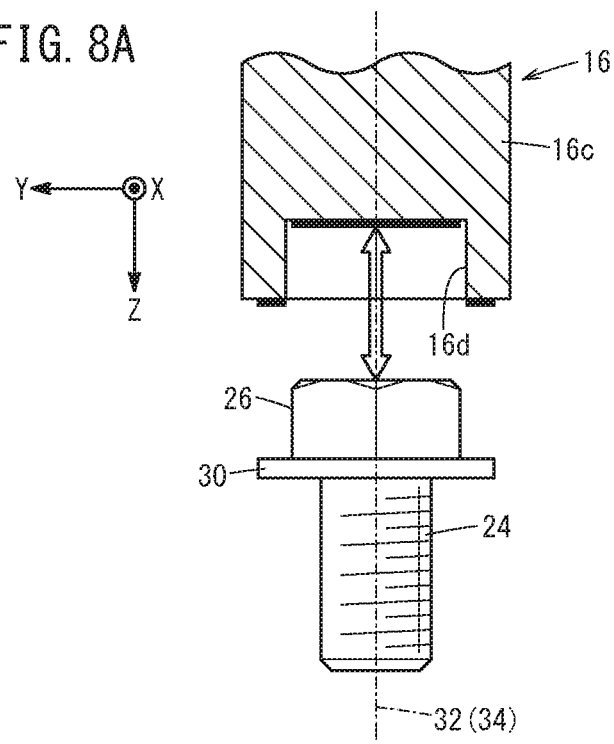
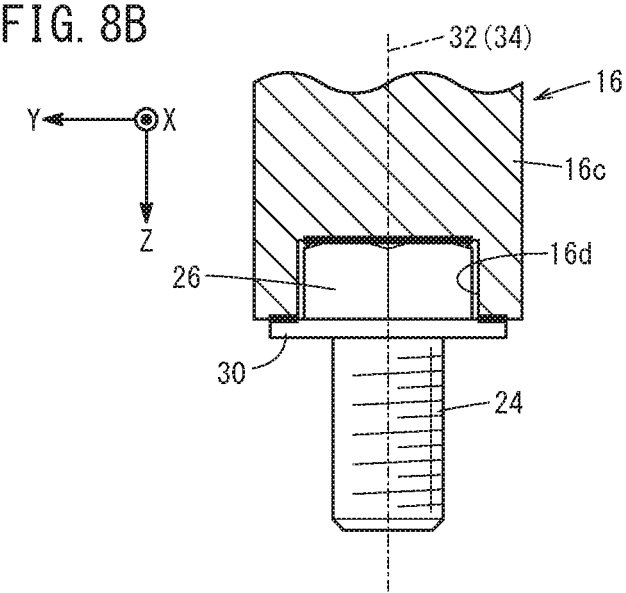

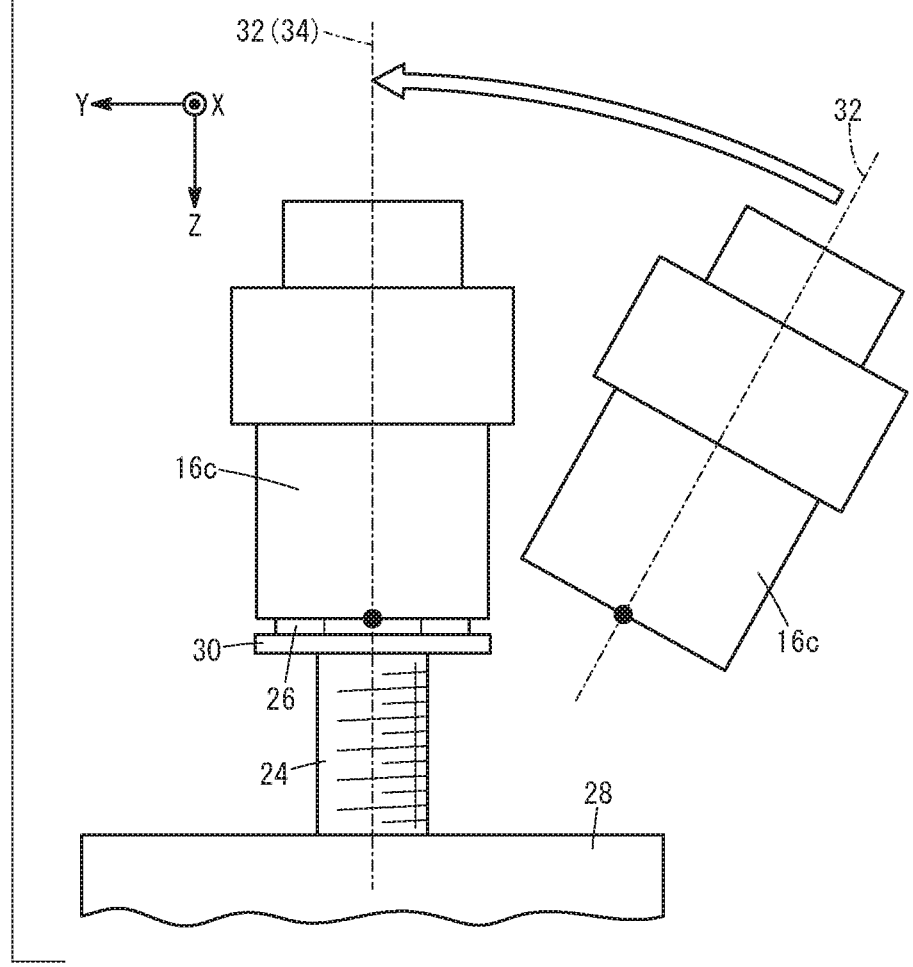

ROBOT SYSTEM AND METHOD FOR CONTROLLING ROBOT

TECHNICAL FIELD

The present invention relates to a robot system and a robot control method (method for controlling a robot) for correcting the deviation amount of an end effector relative to a workpiece when the end effector of the robot is brought into contact with a workpiece to perform work on the workpiece.

BACKGROUND ART

Conventionally, when the end effector of a robot contacts and performs work on a workpiece, such as in assembly work or tightening work involving a target object and a workpiece, there are cases where suitable work cannot be performed on the workpiece due to inconstant conditions such as variations in workpiece tolerances and workpiece installation layouts.

Japanese Patent No. 4850956, Japanese Patent No. 6006256, and Japanese Laid-Open Patent Publication No. 2017-094438 disclose a non-contact-sensing type of control apparatus that calculates a target position of an end effector by capturing an image of the end effector and the workpiece using a camera provided separately from the robot and performing image recognition on a reference position or work target location from the captured image.

Furthermore, Japanese Laid-Open Patent Publication No. 2015-155126 discloses a contact-sensing type of control apparatus that sets in advance a force value or moment value that causes the end effector to converge at a target position (center position), in a state where a plurality of force sensors or a multi-axis detection type of force sensor are/is attached to the end effector, and then, during the actual work, performs feedback control (force-sensitive control) on the robot or end effector to track or follow up the force value or moment value that was set in advance.

SUMMARY OF INVENTION

However, in the technology disclosed in Japanese Patent No. 4850956, Japanese Patent No. 6006256, and Japanese Laid-Open Patent Publication No. 2017-094438, the camera described above, an illumination device that illuminates the area around the end effector and the workpiece, image recognition software for processing the image captured by the camera, and the like are necessary. Furthermore, specialized system equipment for stabilizing characteristics of the image captured by the camera, such as the amount of deviation of the end effector with respect to the workpiece, the change in the brightness of the illumination device, and the blocking of ambient light, and incidental equipment such as a specialized computer (PC) for processing the captured image are also necessary. As a result, building the robot control system incurs a significant cost.

Furthermore, in the technology disclosed in Japanese Laid-Open Patent Publication No. 2015-155126, since feedback control is performed to track the force value or momentum value set in advance, it is possible to form the control system at a low cost. However, since the change in force corresponding to the deviation amount of the end effector relative to the workpiece is detected directly, it is necessary to provide a force sensor at the tip of the robot. This places a restriction on the arrangement of the force sensor during the actual work. Furthermore, the surface of the workpiece must be made to conform to the end effector, that is, the portion of the workpiece in contact with the end effector must be set in the C plane, for example. As a result, the work to which this technology can be applied is limited to prescribed types of work such as fitting a pin into a hole. Furthermore, in order to eliminate the effect of rattling when the end effector contacts the workpiece, it is necessary to provide a specialized jig or robot hand every time actual work is performed, and this results in low versatility.

The present invention aims to solve the above problems, and it is an objective of the present invention to provide a robot system and a robot control method that realize a high degree of versatility at a low cost.

The present invention relates to a robot system configured to, when a sensor has sensed a change in a contact state between an end effector of a robot and a workpiece, estimate a deviation amount of the end effector relative to the workpiece based on the change in the contact state sensed by the sensor and correct the deviation amount by controlling the robot and/or the end effector.

In this case, the robot system includes a control section configured to control the robot and/or the end effector; a detecting section configured to detect data indicating change over time of the contact state when the contact state between the end effector and the workpiece has been changed by the control section; a learning section configured to learn the data; and a judging section configured to judge the contact state between the end effector and the workpiece during actual work performed on the workpiece by the end effector, using learning results of the data obtained by the learning section The detecting section detects in advance, as learning data, a change in the contact state sensed by the sensor, for each of a plurality of set positions on a surface of the workpiece, when the end effector has been caused to contact the set position and a change in the contact state sensed by the sensor when the end effector has been caused to perform a feeling-around operation within a set operational range relative to the set position. The learning section learns a plurality of pieces of the detected learning data and writes learning results of the plurality of pieces of learning data to the judging section. The judging section, during the actual work, acquires the change in the contact state detected by the sensor when the end effector has contacted the surface of the workpiece and, based on the acquired change in the contact state and the written learning results, recognizes a deviation of the end effector relative to the workpiece. The control section estimates the deviation amount based on a judgment result of the judging section.

Furthermore, the present invention relates to a robot control method for, when a sensor has sensed a change in a contact state between an end effector of a robot and a workpiece, estimating a deviation amount of the end effector relative to the workpiece based on the change in the contact state sensed by the sensor and correcting the deviation amount by controlling the robot and/or the end effector. The robot control method includes first to fifth steps that are described below.

The first step includes detecting, as learning data, with a detecting section, a change in the contact state sensed by the sensor for a set position on a surface of the workpiece when the end effector has been caused to contact the set position and a change in the contact state sensed by the sensor when the end effector has been caused to perform a feeling-around operation within a set operational range relative to the set position.

The second step includes learning, with a learning section, the detected learning data.

The third step includes, after the first step and the second step have been repeatedly performed in order, writing learning results of a plurality of pieces of the learning data obtained by the learning section to a judging section.

The fourth step includes, during actual work performed on the workpiece by the end effector, acquiring, with the judging section, the change in the contact state detected by the sensor when the end effector has contacted the surface of the workpiece and, based on the acquired change in the contact state and the written learning results, recognizing a deviation of the end effector relative to the workpiece.

The fifth step includes estimating, with a control section, the deviation amount based on a judgment result of the judging section.

In this way, according to the present invention, even when the deviation amount of the end effector relative to the workpiece is a deviation amount in multidimensional directions, it is possible to recognize the deviation of the end effector relative to the workpiece based on the change in the contact state detected by a single sensor and to estimate the deviation amount based on this recognition result (judgment result). Accordingly, in the present invention, it is possible to estimate the deviation amount using a system configuration that is simpler than the widely known technology described above, and therefore it is possible to build a system with a high degree of mountability at low cost.

Since the data (learning data) is logging data of a one-dimensional change over time, it is easier to handle the acquired data concerning the change of the contact state than in the widely known technology described above. As a result, it is possible to recognize the contact state (deviation) and to control the robot and/or end effector using this recognition result (judgment result) with a general FA device, without using a specialized computer (PC). Therefore, it is possible to achieve a high system operation rate.

Furthermore, by having the robot perform the feeling-around operation with the end effector relative to a plurality of set positions of the workpiece using a technique that is similar to feeling-around work performed manually, the learning section learns a plurality of pieces of the data and, furthermore, recognizes the deviation based on these learning results and the change in the contact state acquired during the actual work. In this way, it is possible to easily estimate the deviation amount. As a result, compared to the technology described in Japanese Laid-Open Patent Publication No. 2015-155126, robustness with respect to tolerance of the workpiece, variation in the installation layout of the workpiece, and disturbances such as rattling of the workpiece is improved.

Yet further, in the present invention, by repeatedly performing the acquisition of the learning data in the set operational range and the learning of this learning data, using a learning function realized by artificial intelligence, it is possible to autonomously acquire the characteristics of the contact state, recognize the deviation, and estimate the deviation amount. Therefore, it is possible to reduce the number of steps needed to develop and adjust the judgment logic for estimating this deviation amount. As a result, it is possible to shorten the introduction period of the robot system.

In this way, in the present invention, it is possible to realize the robot system and the robot control method that have higher versatility and lower cost than in the widely known technology described above.

Here, during the actual work, the detecting section detects, as actual data, the change in the contact state sensed by the sensor when the end effector has contacted an arbitrary position on the surface of the workpiece and the change in the contact state sensed by the sensor when the end effector has been caused to perform the feeling-around operation within an arbitrary operational range relative to the arbitrary position. In this way, the judging section recognizes the deviation of the end effector relative to the workpiece, based on the detected actual data and the learning results of the learning data that resembles the actual data and which is included in the written learning results. As a result, it is possible to accurately estimate the deviation amount with the control section. Accordingly, in the present invention, it is possible to easily build a recognition and judgment processing system for estimating the deviation amount.

Furthermore, the plurality of pieces of learning data have characteristics that differ according to the type of deviation of the end effector relative to the workpiece. Therefore, the learning section learns the characteristics that differ according to the type of deviation, for the plurality of pieces of learning data. During the actual work, the judging section identifies the type of deviation corresponding to the actual data, by judging the contact state indicated by the actual data using the learning results. In this way, the judging section recognizes the deviation of the end effector relative to the workpiece, using the actual data and the learning results of the learning data corresponding to the identified deviation type, which is included in the written learning results. As a result, it is possible to even more accurately estimate the deviation amount with the control section.

Furthermore, it is possible to bring the end effector into contact with the workpiece without damaging the workpiece, by controlling the robot and/or the end effector with the control section or causing the end effector to move within the movable range using the external force movable mechanism, such that the contact state between the end effector and the workpiece does not exceed a threshold value.

If the sensor is a touch sensor mounted in the vicinity of the end effector on the robot, it is possible to easily detect the change in the contact state and to improve the durability of the sensor while further lowering the cost.

In this case, the touch sensor may be mounted on the robot so as to be substantially coaxially with the central axis of the end effector or mounted on the robot in a state where the axis of this touch sensor is not coaxial with the central axis. If the axis of the touch sensor is not coaxial with the central axis, the end effector may be mounted on the robot via the touch sensor. In either case, it is possible to easily detect the change in the contact state.

If the workpiece is a member assembled on the target object or a member tightened to the target object and the end effector is a tool configured to assemble the member on the target object or a tool configured to tighten the member on the target object, it is possible to easily correct the deviation amount in the assembly work or tightening work involving the target object and the member.

BRIEF DESCRIPTION OF DRAWINGS

FIG. 8A is a descriptive view of a state before contact between the socket of the nut runner and the bolt, and FIG. 8B is a descriptive view of a contact state when the socket and the bolt of FIG. 8A are fitted together;

FIG. 23 is a descriptive diagram showing an operation for correcting the deviation amount of the socket relative to the bolt.

DESCRIPTION OF EMBODIMENTS

The following describes preferred embodiments of a robot system and robot control method according to the present invention, while referencing the accompanying drawings.

[1. Configuration of the Present Embodiment]

Figure 1:
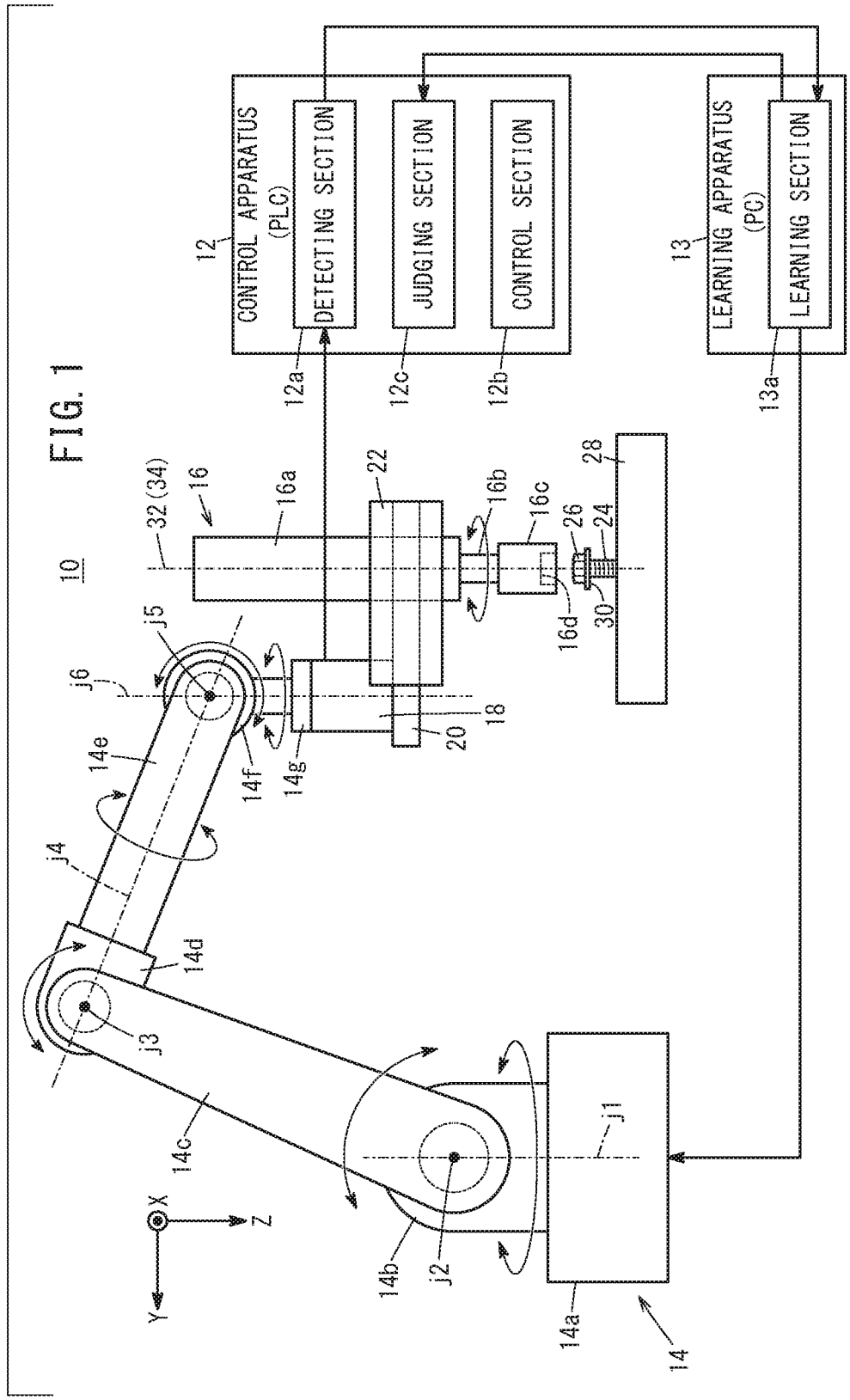
FIG. 1 is a configurational view of a robot system according to the present embodiment during learning.
Figure 2:
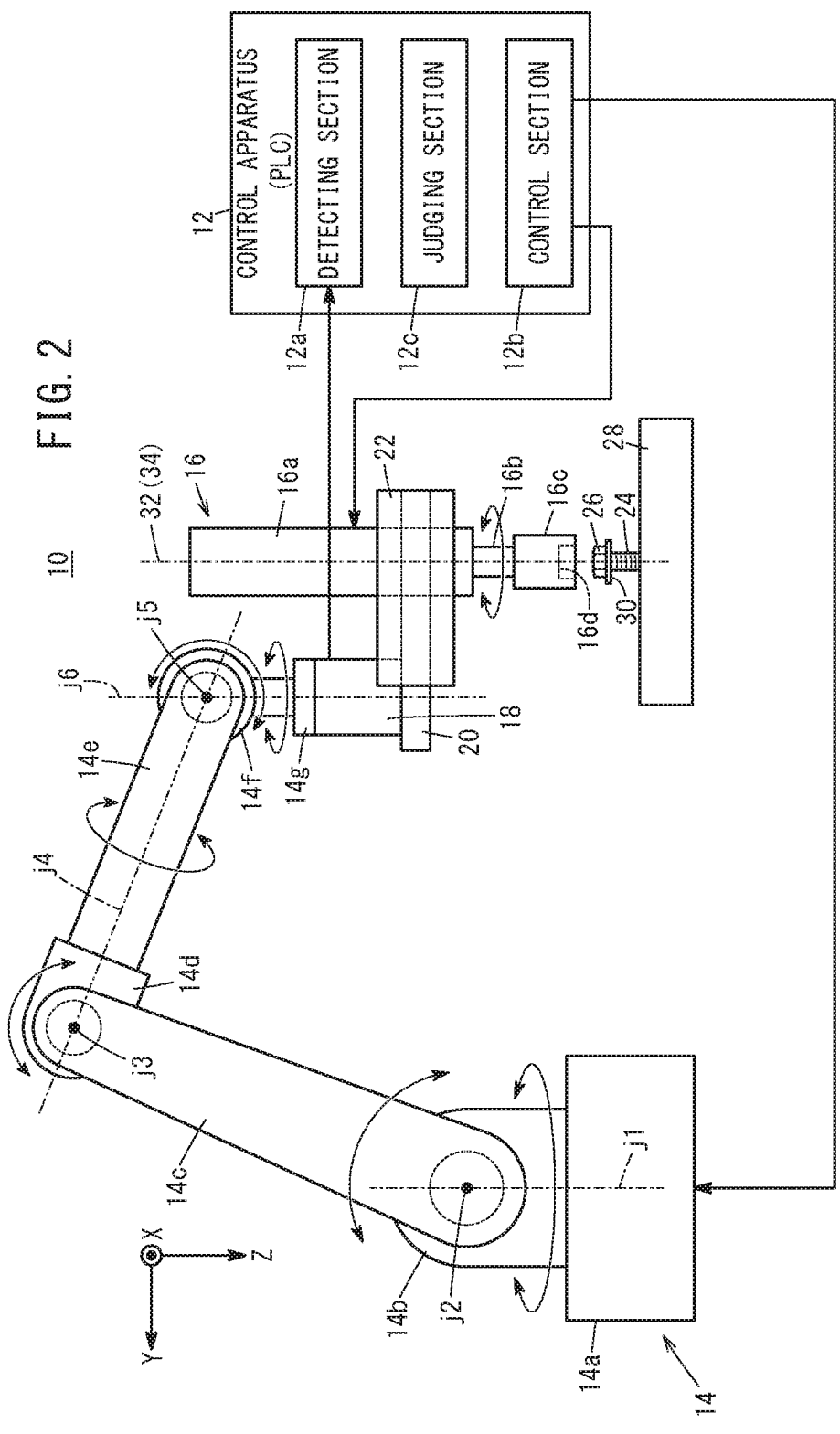
FIG. 2 is a configurational view of a robot system according to the present embodiment during actual work.

FIGS. 1 and 2 are configurational views of a robot system 10 according to the present embodiment.

<1.1 Outline of the Robot System 10>

The robot system 10 includes a control apparatus 12, a learning apparatus 13, a robot 14 that is controlled by the control apparatus 12 and the learning apparatus 13, a nut runner 16 serving as an end effector such as a robot hand or hand tool attached to a tip portion of the robot 14, and a sensor 18 mounted on the tip portion of the robot 14.

The control apparatus 12 is formed by a PLC (Programmable Logic Controller), and realizes the functions of a detecting section 12a, a control section 12b, and a judging section 12c by reading and executing a program stored in a memory (not shown in the drawings). The learning apparatus 13 is formed mainly by a PC, and realizes the functions of a learning section 13a that includes an artificial intelligence learning function, by reading and executing a program stored in a memory (not shown in the drawings). The control apparatus 12 and the learning apparatus 13 are capable of performing bidirectional data communication. In this case, during the learning shown in FIG. 1, the learning apparatus 13 performs prescribed deep learning while controlling the robot 14 and supplies these learning results to the control apparatus 12. On the other hand, during the actual work shown in FIG. 2, which is after the learning, the control apparatus 12 controls the robot 14 and the nut runner 16 using the learning results and causes the robot 14 and the nut runner 16 to perform prescribed work.

That is, during the learning shown in FIG. 1, the learning section 13a controls the robot 14 and the detecting section 12a generates (detects) waveform data (learning waveform data) described further below from the sensing results of the sensor 18. The learning section 13a learns the learning waveform data (learning data) detected by the detecting section 12a and writes the learning results to the judging section 12c.

On the other hand, during the actual work shown in FIG. 2, the control section 12b controls the robot 14 and the nut runner 16, and the detecting section 12a detects waveform data (actual waveform data) described further below from the sensing results of the sensor 18. The judging section 12c performs a prescribed recognition process (judgment process) on the actual waveform data (actual data) detected by the detecting section 12a, using the learning results. The control section 12b causes the robot 14 and the nut runner 16 to perform the prescribed work, by controlling the robot 14 and the nut runner 16 based on the recognition result (judgment result) of the judging section 12c.

Accordingly, in the robot system 10 of the present embodiment, the learning section 13a realizes the function of the control section 12b during learning. In the robot system 10, the control apparatus 12 may be realized by one PLC, or a plurality of PLCs may be used and assigned to the respective processes of the detecting section 12a, the control section 12b, and the judging section 12c to perform these processes in parallel. That is, from the viewpoint of the processing loads, the learning apparatus 13 that includes the learning section 13a and the control apparatus 12 that includes the detecting section 12a, the control section 12b, and the judging section 12c should be separate apparatuses. That is, since extremely large amounts of memory capacity and computing capacity are necessary during the learning operation, the PC mainly functions as the learning apparatus 13. On the other hand, during the actual work, parameters of the learning results are used to perform the prescribed recognition process and control process, and therefore only minimal amounts of memory capacity and computing capacity are needed. Accordingly, a PLC that is a general FA device functions as the control apparatus 12.

<1.2 Configuration of Each Section in the Robot System 10>

The following is a detailed description of the configuration of each section of the robot system 10.

The robot 14 may be a six-axis multi-jointed robot, for example. More specifically, the robot 14 includes a first base 14a serving as a mounting platform that is a base portion, a second base 14b, a first arm 14c, a first joint portion 14d, a second arm 14e, a second joint portion 14f, and an end effector attachment portion 14g that is a tip portion, and these components are connected in the stated order. The sensor 18 and the nut runner 16 are mounted on the end effector attachment portion 14g.

The second base 14b is axially supported by the first base 14a in a manner to be pivotable (rotatable) centered on a first axis j1, which is a vertical axis (Z-axis in the direction of gravity). The first arm 14c is axially supported by the second base 14b in a manner to be swingable (rotatable) centered on a second axis j2, which is a horizontal axis (X-axis or Y-axis) orthogonal to the vertical axis. The first joint portion 14d is axially supported by the tip portion of the first arm 14c in a manner to be swingable (rotatable) centered on a third axis j3, which is an axis parallel to the second axis j2. The second arm 14e is axially supported by the first joint portion 14d in a manner to be rotatable centered on a fourth axis j4 that runs along a direction (longitudinal direction) from the first joint portion 14d toward the tip portion of the second arm 14e. The second joint portion 14f is axially supported on the tip portion of the second arm 14e in a manner to be rotatable centered on a fifth axis j5 parallel to the third axis j3. The end effector attachment portion 14g is axially supported by the second joint portion 14f in a manner to be rotatable centered on a sixth axis j6 that runs along a direction from the second joint portion 14f toward the tip portion.

The sensor 18 is touch sensor that is capable of detecting six axial components (force components in the three axial directions of the X-axis, the Y-axis, and the Z-axis and moment components in the three axial directions of the X-axis, the Y-axis, and the Z-axis), for example. The top surface of the sensor 18 is mounted on the tip portion of the end effector attachment portion 14g, such that the sensor 18 is substantially coaxial with the sixth axis j6. A nut runner support member 20 is mounted on a bottom surface of the sensor 18, which is opposite the end effector attachment portion 14g.

The nut runner support member 20 is a board-shaped member that extends in a direction orthogonal to the sixth axis j6. The bottom surface of the sensor 18 is mounted on one end portion of the nut runner support member 20, and the nut runner 16 is mounted on the other end portion of the nut runner support member 20 to be substantially parallel to the sixth axis j6. Accordingly, the nut runner 16 is attached to the end effector attachment portion 14g via the nut runner support member 20 and the sensor 18. On each side surface of the nut runner support member 20, a side board 22 for supporting wiring (not shown in the drawings) led from the nut runner 16 and the sensor 18 is provided along the longitudinal direction of the nut runner support member 20.

The nut runner 16 includes a pillar-shaped drive portion 16a that is supported by the nut runner support member 20, and a socket 16c that is mounted on a tip (bottom end) of a shaft 16b of the nut runner 16 extending downward from the drive portion 16a and is rotatable centered on the shaft 16b due to driving of the drive portion 16a. The drive portion 16a is supported in a state of being inserted through the nut runner support member 20 substantially parallel to the sixth axis j6. Accordingly, the shaft 16b of the nut runner 16 extends downward substantially parallel to the sixth axis j6. The socket 16c includes a recessed portion 16d capable of fitting with a head portion 26 of a bolt 24 serving as a workpiece. Furthermore, the bolt 24 is screwed into a screw hole of a target object 28, such as a vehicle body or motor, arranged on a work platform (not shown in the drawings).

The robot system 10 according to the present embodiment is not limited to being used in a case where the workpiece is the bolt 24, and the workpiece may be a member to be assembled together with the target object 28 or a member to be tightened on the target object 28. Accordingly, in the robot system 10, the end effector is not limited to being the nut runner 16, and may be a tool (hand tool) for assembling or tightening the above member onto the target object 28. In other words, the robot system 10 is not limited to performing tightening work, and can perform various types of assembly work using a robot hand or hand tool (end effector), such as fitting of a dowel pin, fitting of coupler and connector, axis alignment for bolt and tap hole, and fitting of various shaft members and holes, for example. Furthermore, the workpiece is not limited to being a tightening member, and may be a component used for fitting or assembly. In the following description, an example is described of a case in which the bolt 24 serving as the workpiece is a hexagonal bolt with a flange 30, and the head portion 26 of the hexagonal bolt is fitted with the recessed portion 16d having a hexagonal shape in the socket 16c of the nut runner 16 serving as the end effector.

The control section 12b of the control apparatus 12 drives motors (not shown in the drawings) inside the robot 14 by supplying a control signal to the robot 14, thereby causing shafts (first to sixth axes j1 to j6) of the motors to rotate, to cause the robot 14 to operate. In this way, it is possible to fit the recessed portion 16d of the socket 16c onto the head portion 26 of the bolt 24, for example. Furthermore, by supplying a control signal to the nut runner 16, the control section 12b drives the drive portion 16a of the nut runner 16 to rotate the socket 16c centered on the shaft 16b. In this way, when the recessed portion 16d of the socket 16c is fitted onto the head portion 26 of the bolt 24, it is possible to perform the work of assembling or tightening the bolt 24 onto the target object 28.

The sensor 18 sequentially detects the change of the contact state between the socket 16c and the bolt 24, specifically the three axial components of the contact force (reaction force) that the socket 16c receives from the bolt 24 and the three axial components of the moment of this contact force, when the socket 16c of the nut runner 16 contacts the bolt 24, and sequentially outputs the detection results of these six axial components to the control apparatus 12. Since the sensor 18 only needs to be able to detect the change of the contact state between the socket 16c and the bolt 24, there is no need to arrange the sensor 18 coaxially with the nut runner 16, such as shown in FIG. 1. Of course, if the sensor 18 is arranged substantially coaxially with the nut runner 16, it is still possible to sense the change of the contact force.

The sensor 18 may be a plurality of torque sensors that are provided near the first to sixth axes j1 to j6 and detect the torques of the motors. In this case, the plurality of torque sensors detect the torques of the motors and output these detection results to the control apparatus 12. The detecting section 12a of the control apparatus 12 only needs to estimate the change of the contact force between the socket 16c and the bolt 24 based on the detection results of the plurality of torque sensors.

Furthermore, the sensor 18 only needs to be able to detect the change of the contact state between the socket 16c and the bolt 24, and therefore the sensor 18 may be an acoustic sensor such as a microphone that detects sound generated when the contact state between the socket 16c and the bolt 24 changes or any of a variety of vibration sensors that detect vibrations generated when the contact state between the socket 16c and the bolt 24 changes. Furthermore, in a case where the sensor 18 is a non-contact type of sensor such as an acoustic sensor, the sensor 18 only needs to be arranged near the socket 16c and the bolt 24, without being mounted on the robot 14. In any of the above cases, the detecting section 12a of the control apparatus 12 is capable of detecting the change over time of the contact state between the socket 16c and the bolt 24, as the waveform data, from the sensing results of the sensor 18.

In the following description, a case is described in which a touch sensor mounted on the robot 14 is used as the sensor 18 and the change in the contact state between the socket 16c and the bolt 24 is sensed by the sensor 18.

During the learning shown in FIG. 1, the learning section 13a of the learning apparatus 13 controls the robot 14 to thereby perform a feeling-around operation of bringing the socket 16c into contact with the head portion 26 of the bolt 24.

The feeling-around operation refers to work for fitting the recessed portion 16d of the socket 16c and the head portion 26 of the bolt 24 together by changing the contact state of the socket 16c relative to the head portion 26 of the bolt 24, using a technique similar to performing this work manually by feel. Accordingly, the feeling-around operation may be any type of operation, as long as it changes the contact state between the end effector (nut runner 16) and the workpiece (bolt 24). For example, it is possible to perform the feeling-around operation by performing rotation of the socket 16c with respect to the bolt 24, planar movement of translating the socket 16c with respect to the bolt 24 in the X direction and the Y direction, twisting of the bolt 24 in a tightening axial direction (Z direction), or pivoting that includes both rotation and planar movement. Furthermore, in a state where a vibration applying mechanism (not shown in the drawings) is mounted on the end effector (nut runner 16) and the end effector and the workpiece are in contact with each other, it is possible to perform the feeling-around operation by applying various vibrations (e.g., ultrasonic vibration) to the end effector from this vibration applying mechanism.

The detecting section 12a of the control apparatus 12 detects, as the learning waveform data, the Z-axis component (contact force Fz) of the contact force F (see FIGS. 3 and 4) over time, for example, based on the six axial components input from the sensors 18 when the feeling-around process is performed, and supplies the detected learning waveform data to the learning section 13a. The learning section 13a learns the characteristics of the learning waveform data supplied thereto, and writes these learning results to the judging section 12c. The details of the functions of the learning section 13a and the feeling-around operation are described further below.

On the other hand, during the actual work shown in FIG. 2, the control section 12b of the control apparatus 12 controls the robot 14 and the nut runner 16 to thereby fit the socket 16c and the head portion 26 of the bolt 24 together and screw the bolt 24 into the target object 28. In this case, the detecting section 12a detects the contact force Fz over time as the actual waveform data, for example, based on the six axial components input from the sensor 18, and supplies the detected actual waveform data to the judging section 12c.

The judging section 12c recognizes the contact state indicated by the actual waveform data supplied thereto, using the learning results written during the learning, and recognizes (judges) the contact state, that is, the presence or absence of deviation (displacement) of the socket 16c relative to the head portion 26 of the bolt 24, from these recognition results. The recognition result (judgment result) of the judging section 12c is supplied to the control section 12b. The control section 12b estimates the deviation amount of the socket 16c relative to the head portion 26 of the bolt 24, based on the recognition results supplied thereto, and controls the robot 14 and the nut runner 16 using the estimated deviation amount as the control amount. In this way, it is possible to accurately perform the assembly work or tightening work of the bolt 24 with respect to the target object 28. The details of the function of the judging section 12c and the actual work are described further below.

The above describes a process in which the detecting section 12a detects the learning waveform data during the learning and detects the actual waveform data during the actual work, for example. In the present embodiment, it is possible to apply data processing using mathematical processing or the like instead of the processing of the waveform data such as described above.

In such a case, during the learning, the detecting section 12a detects the data of the contact force Fz as the learning data, based on the six axial components sequentially input from the sensor 18, and during the actual work, the detecting section 12a detects the data of the contact force Fz as the actual data, based on the six axial components sequentially input from the sensor 18. In this way, the learning section 13a can learn the characteristics of the learning data through deep learning, and write these learning results to the judging section 12c. Furthermore, the judging section 12c can recognize the contact state indicated by the actual data through mathematical processing or the like, using the written learning results, and recognize the presence or absence of deviation of the socket 16c relative to the head portion 26 of the bolt 24 from these recognition results.

In the following description, a case is described in which the detecting section 12a detects the learning waveform data during the learning, and detects the actual waveform data during the actual work.

FIGS. 1 and 2 schematically show a configuration in the vicinity of the nut runner 16. Here, a specific configuration in the vicinity of the nut runner 16 is described while referencing FIGS. 3 and 7.

Figure 3:
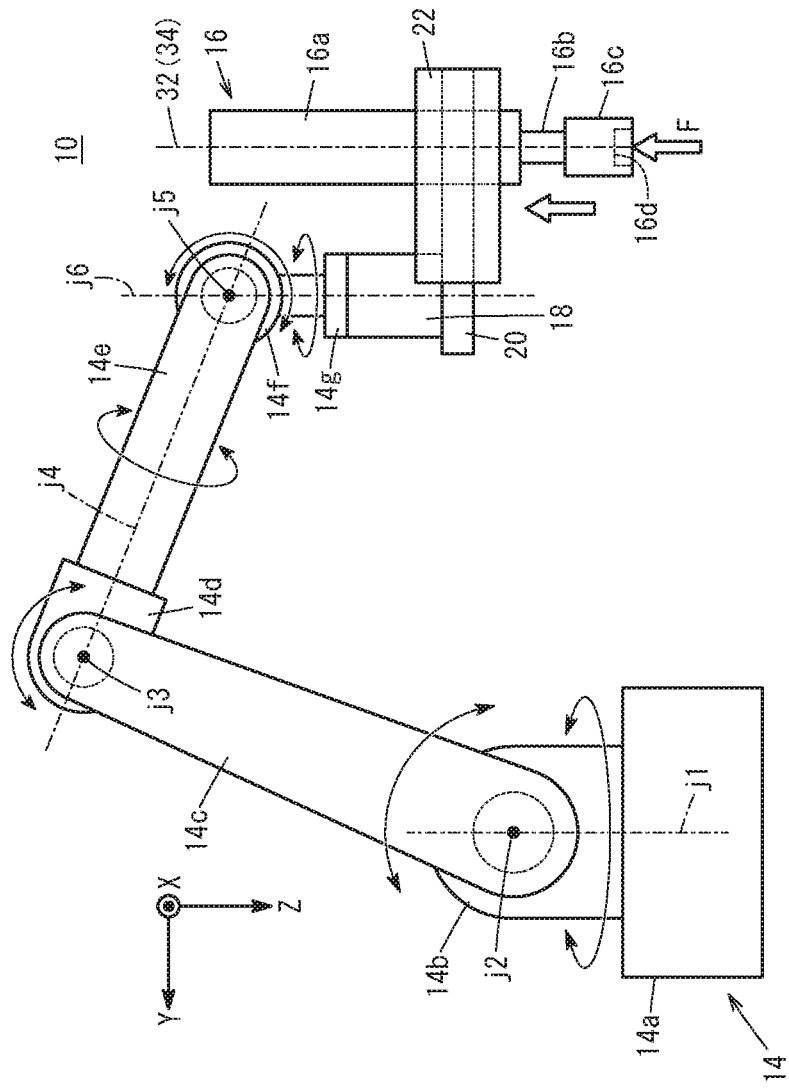
FIG. 3 is a configurational view of a robot showing a contact force applied to a socket in FIGS. 1 and 2 in a case where a nut runner moves linearly in the Z direction due to this contact force.

As shown in FIG. 3, when the socket 16c is in contact with the head portion 26 of the bolt 24 (see FIGS. 1 and 2), the socket 16c receives the load of the contact force F (Fz). In this case, it is necessary to reduce the load on the socket 16c to such a degree that the contact force F applied to the bolt 24 by the socket 16c does not exceed a threshold value, while keeping the bolt 24 and the socket 16c in contact with each other. The threshold value refers to an upper limit value for the contact force F that does not cause damage to the bolt 24 (maximum value for the load placed on the bolt 24).

Therefore, in order to reduce the load of the socket 16c that accompanies the contact with the bolt 24, there are ideas to (1) move the nut runner 16 in the Z direction (upward in the planes of FIGS. 1 to 3) by controlling the robot 14 based on the sensing results of the sensor 18 and (2) move the socket 16c or the nut runner 16 upward. FIGS. 4 to 7 show concrete implementations of the idea (2) described above, wherein a linear movement mechanism 27 (see FIGS. 4 and 5) or a linear movement mechanism 29 (see FIGS. 6 and 7) serving as an external force movable mechanism is provided to the nut runner 16.

Figure 4:
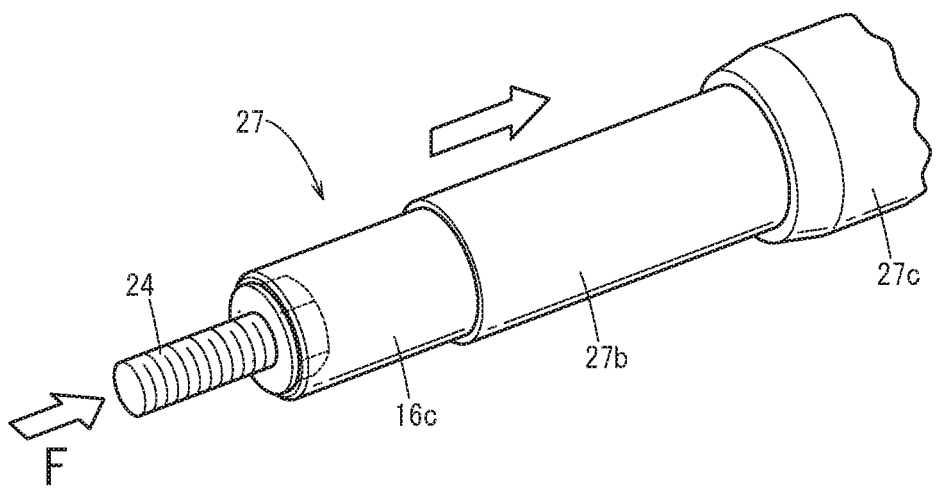
FIG. 4 is a schematic perspective view showing a case where a linear movement mechanism that moves the socket shown in FIGS. 1 to 3 linearly in the Z direction is provided.
Figure 5:
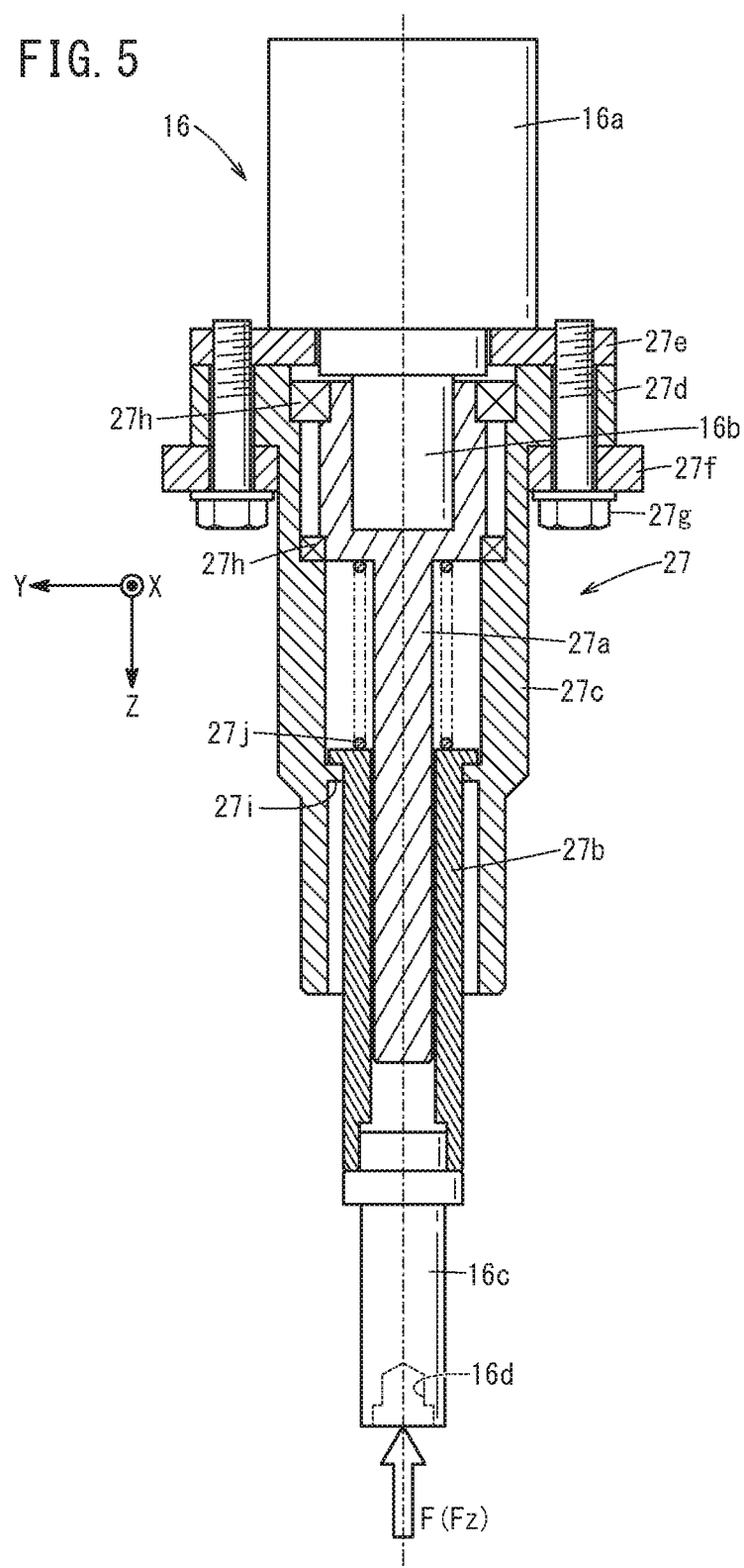
FIG. 5 is an internal configurational view of the linear movement mechanism of FIG. 4.

The linear movement mechanism 27 of FIGS. 4 and 5 is configured to linearly change the stroke amount (movement amount) of the socket 16c in the Z direction relative to the value of the contact force F (Fz). In this case, the linear movement mechanism 27 is provided between the socket 16c and the drive portion 16a and shaft 16b of the nut runner 16.

The linear movement mechanism 27 includes a stepped rod 27a that extends in the Z direction. One end portion of the rod 27a is fitted with the shaft 16b of the nut runner 16. The other end portion of the rod 27a is inserted into a tubular connecting member 27b that extends in the Z direction. One end portion of the connecting member 27b into which the rod 27a is inserted is provided with a flange. The other end portion of the connecting member 27b is fitted with a base end portion of the socket 16c.

A bearing holder 27c that houses the rod 27a and one end portion side of the connecting member 27b is arranged on a radially outward side of the rod 27a. The bearing holder 27c is a stepped tubular member that extends in the Z direction, and a flange 27d is formed on one end portion thereof on the drive portion 16a side. The flange 27d is sandwiched by one plate member 27e fixed to the drive portion 16a and another plate member 27f on the socket 16c side. In this case, the bearing holder 27c is fixed to the drive portion 16a by integrally fastening the two plate members 27e and 27f together with the flange 27d using screw members 27g.

Two bearings 27h are provided between the flange 27d side of the inner peripheral surface of the bearing holder 27c and one end portion side of the outer peripheral surface of the rod 27a. Furthermore, one end portion (flange) of the connecting member 27b engages with a protrusion 27i formed on the inner peripheral surface of the bearing holder 27c. In this way, the socket 16c and the connecting member 27b are prevented from protruding farther to the socket 16c side than the position shown in FIG. 5. Furthermore, a spring 27j is interposed between the one end portion of the connecting member 27b and the one end portion of the rod 27a. The spring 27j has an elastic force in a direction toward the socket 16c (a direction opposite the contact force Fz).

By fixing the drive portion 16a or the bearing holder 27c to the nut runner support member 20 (see FIGS. 1 to 3), it is possible to support the nut runner 16 and the linear movement mechanism 27 on the nut runner support member 20.

In the linear movement mechanism 27 shown in FIGS. 4 and 5, when the socket 16c contacts the head portion 26 of the bolt 24 and the socket 16c receives the contact force Fz, this contact force Fz is transferred to the spring 27j via the socket 16c and the connecting member 27b. As a result, the spring 27j contracts toward the drive portion 16a in opposition to the elastic force, due to the contact force Fz. In this case, the spring 27j deforms linearly in the Z direction in accordance with the value of the contact force Fz. In this way, it is possible to change the stroke amount of the socket 16c and the connecting member 27b linearly relative to the contact force Fz. Accordingly, the contraction amount of the spring 27j corresponds to the stroke amount, whose movable range is the movable range of the socket 16c.

On the other hand, when the contact state between the socket 16c and the head portion 26 of the bolt 24 is dissolved, the spring 27j displaces the connecting member 27b to the socket 16c side due to the elastic force. As a result, the socket 16c and the connecting member 27b return to the positions shown in FIG. 5. When the drive portion 16a provides driving and the shaft 16b rotates, the rod 27a, the connecting member 27b, and the socket 16c rotate integrally.

Figure 6:
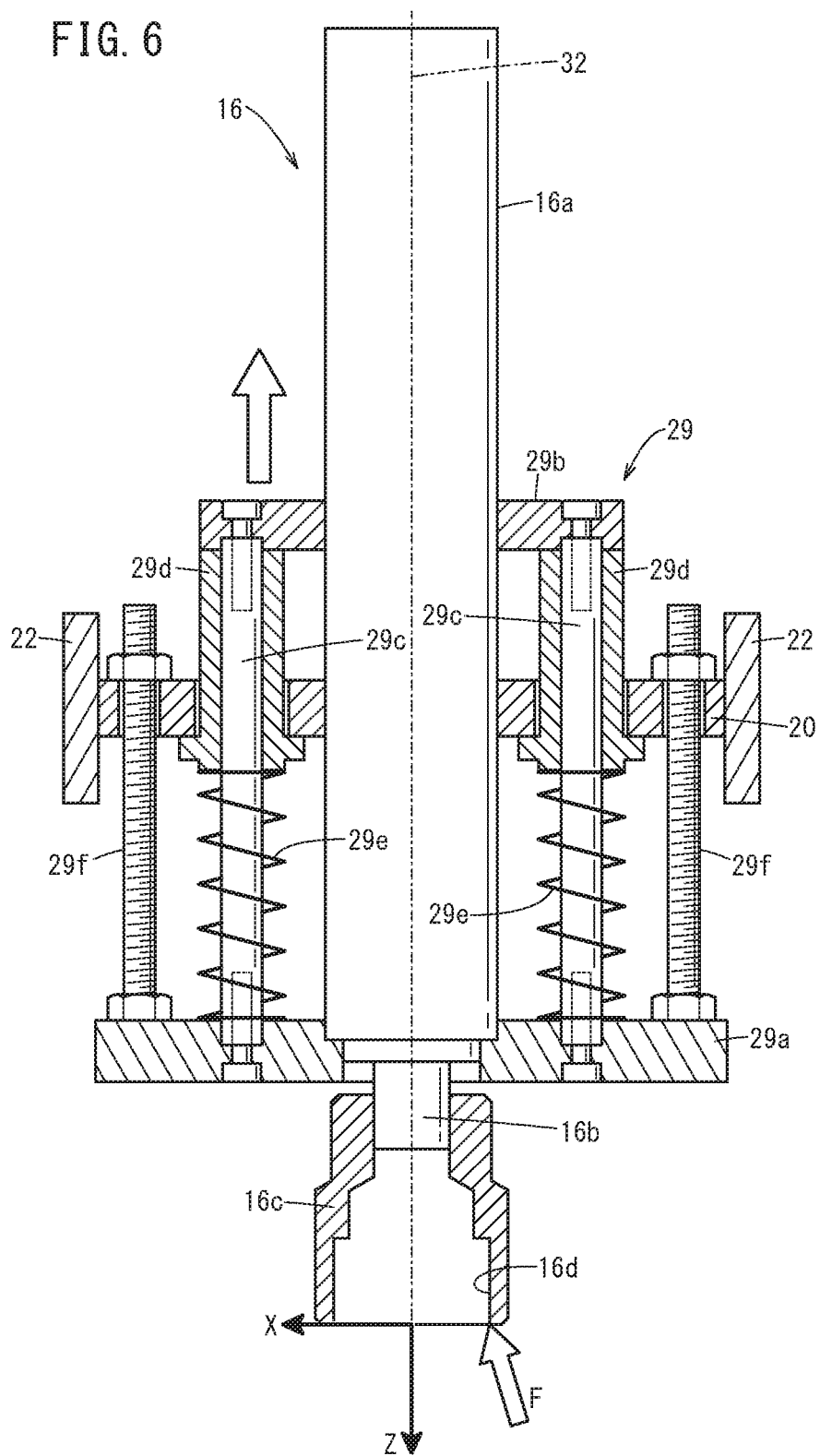
FIG. 6 is a schematic configurational view showing a case where a linear movement mechanism that moves the nut runner shown in FIGS. 1 to 3 linearly in the Z direction is provided.
Figure 7:
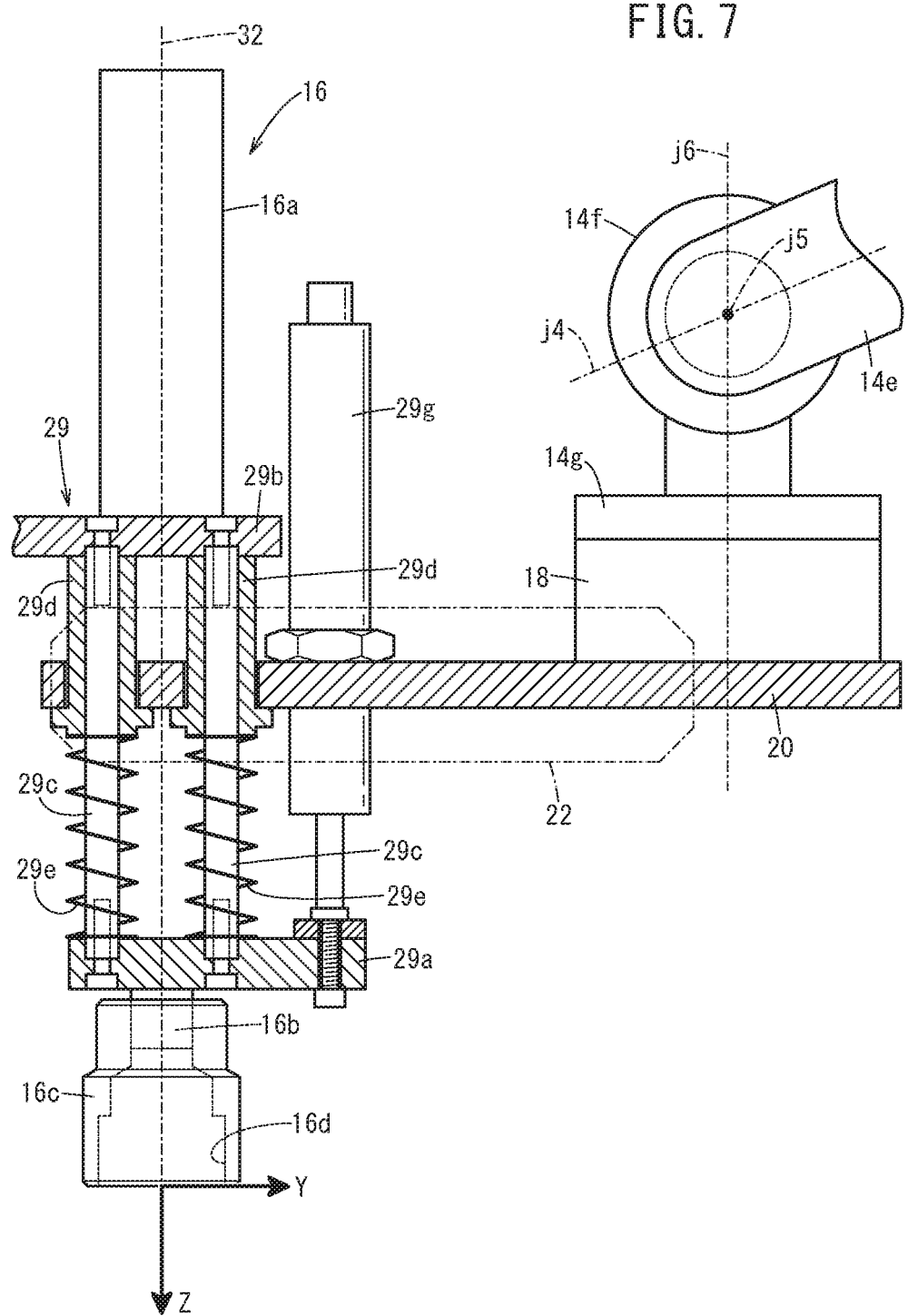
FIG. 7 is an internal configurational view of the linear movement mechanism of FIG. 6.

The linear movement mechanism 29 shown in FIGS. 6 and 7 is configured to linearly change the stroke amount of the entire nut runner 16 in the Z direction relative to the value of the contact force F (Fz). In this case, the linear movement mechanism 29 is provided to the drive portion 16a of the nut runner 16.

The linear movement mechanism 29 includes a base bottom board 29a that extends substantially parallel to the nut runner support member 20 and is fixed to the bottom end portion of the drive portion 16a, and a base top board 29b that extends substantially parallel to the nut runner support member 20 and is fixed to a center portion of the drive portion 16a. The base bottom board 29a and the base top board 29b are connected by four linear movement rods 29c extending in the Z direction. In this case, the four linear movement rods 29c are inserted through four tubular holders 29d provided penetrating through the nut runner support member 20 in the Z direction, thereby connecting the base bottom board 29a and the base top board 29b. A spring 29e is interposed between the base bottom board 29a and a holder 29d in each of the four linear movement rods 29c. Each spring 29e has an elastic force in a direction toward the socket 16c (a direction opposite the contact force Fz). In the linear movement mechanism 29, a plurality of rods 29f are provided extending upward from the base bottom board 29a and penetrating through the nut runner support member 20. The linear movement mechanism 29 further includes a damper 29g that is fixed to the nut runner support member 20 and has a tip portion connected to the base bottom board 29a.

Accordingly, the nut runner 16 and the linear movement mechanism 29 are supported by the nut runner support member 20, via the base top board 29b and the holders 29d.

With the linear movement mechanism 29, when the socket 16c contacts the head portion 26 of the bolt 24 (see FIGS. 1 and 2) and the socket 16c receives the contact force F (Fz), this contact force Fz is transferred to each spring 29e and the damper 29g via the socket 16c, the shaft 16b, the drive portion 16a, and the base bottom board 29a. As a result, each spring 29e contracts upward in opposition to the elastic force, due to the contact force Fz. In this way, the base bottom board 29a, the base top board 29b, the linear movement rods 29c, and the rods 29f, which form the linear movement mechanism 29, and the nut runner 16 fixed to the base bottom board 29a and the base top board 29b are integrally displaced upward in the Z direction.

In this case, the springs 29e deform linearly in the Z direction relative to the value of the contact force Fz. In this way, the stroke amount of the base bottom board 29a, the base top board 29b, the linear movement rods 29c, the rods 29f, and the nut runner 16 can be changed linearly relative to the contact force Fz. Accordingly, the contraction amount of each spring 29e corresponds to the stroke amount, and the movable range thereof is the movable range of the nut runner 16. Furthermore, the damper 29g absorbs the vibration and shock occurring in the nut runner 16 and the base bottom board 29a by receiving the contact force Fz.

On the other hand, when the contact state between the socket 16c and the head portion 26 of the bolt 24 is dissolved, the springs 29e displace the base bottom board 29a downward due to the elastic force. As a result, the base bottom board 29a, the base top board 29b, the linear movement rods 29c, the rods 29f, and the nut runner 16 return to the positions shown in FIGS. 6 and 7.

The following describes the configuration and operation of the robot system 10, according to the schematic views of FIGS. 1 and 2. Therefore, in parts of the following description, there are cases where the configurations and operations of the linear movement mechanisms 27 and 29 are omitted.

[2. Description Concerning Deviation Between the Socket 16c and the Bolt 24]

Prior to the description of the operation of the robot system 10 according to the present embodiment, problems and the like occurring in a case where various types of deviation occur between the socket 16c of the nut runner 16 and the bolt 24 during the performance of the assembly work or tightening work involving the bolt 24 and target object 28 using the nut runner 16 are described while referencing FIGS. 8A to 16. Here, the description will also reference FIGS. 1 and 2 as needed.

FIGS. 8A and 8B are diagrams for describing a case where no deviation occurs between the socket 16c and the bolt 24. On the other hand, FIGS. 9A to 12B are diagrams for describing cases where some type of deviation occurs between the socket 16c and the bolt 24.

In the case of FIG. 8A, a central axis 32 of the socket 16c (the shaft 16b of the nut runner 16 shown in FIGS. 1 and 2) and a central axis 34 of the bolt 24 are substantially coaxial, and none of the types of deviation described further below occur. Therefore, when the socket 16c is lowered along the Z-axis, the recessed portion 16d of the socket 16c and the head portion 26 of the bolt 24 fit together, as shown in FIG. 8B. In FIG. 8B, contact locations between the socket 16c and the bolt 24 are shown by thick solid lines. That is, in FIG. 8B, the recessed portion 16d of the socket 16c and the head portion 26 of the bolt 24 are in surface contact with each other, and the tip of the socket 16c and the flange 30 of the head portion 26 of the bolt 24 are in linear contact or surface contact with each other.

Figure 9A:
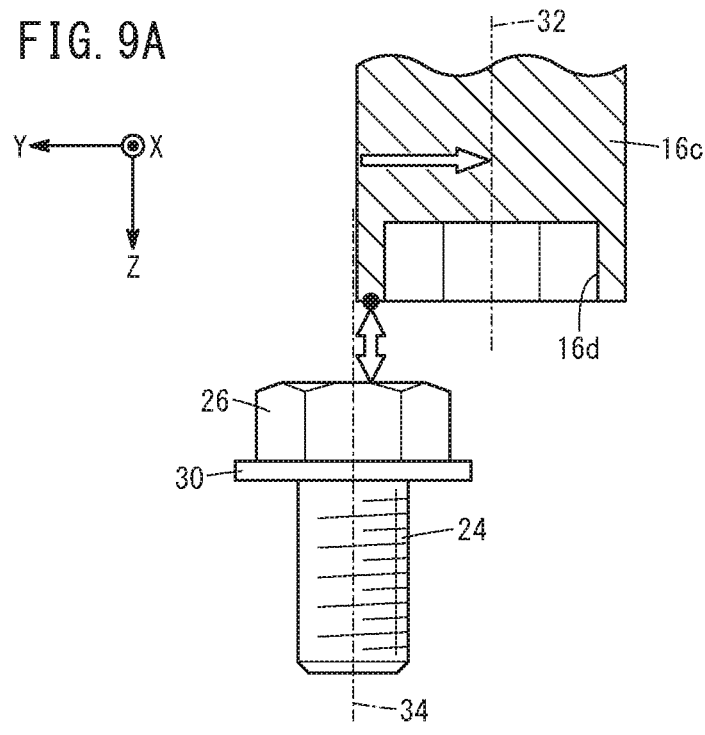
FIG. 9A is a descriptive view of a state before contact between the socket and the bolt when the socket experiences parallel deviation relative to the bolt.
Figure 9B:
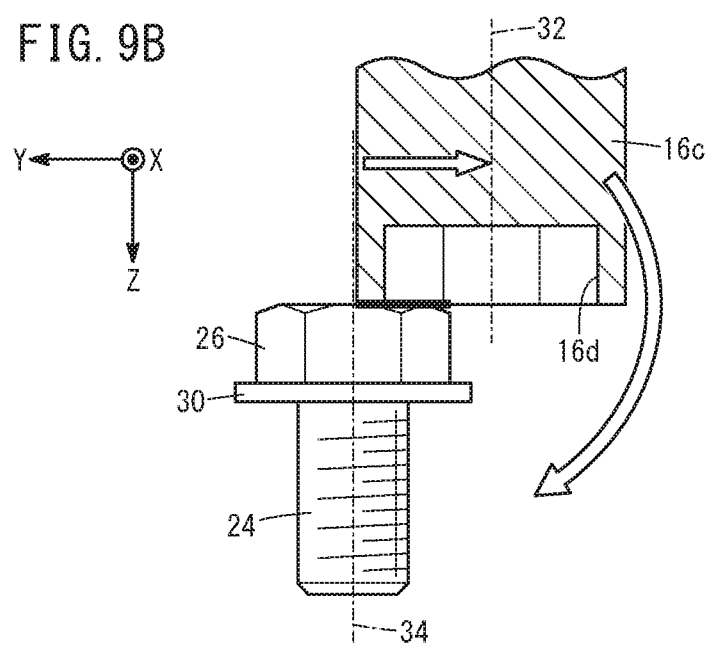
FIG. 9B is a descriptive view of a contact state of the socket and the bolt of FIG. 9A.

On the other hand, FIGS. 9A and 9B show a case in which the central axis 32 of the socket 16c is deviated or displaced in the Y direction relative to the central axis 34 of the bolt 24. In the following, a case in which the two central axes 32 and 34 are deviated relative to each other in a parallel manner is referred to as "parallel deviation". In this case, when the socket 16c is lowered along the Z-axis, the tip of the socket 16c contacts the head portion 26 of the bolt 24 so that the recessed portion 16d of the socket 16c cannot fit with the head portion 26 of the bolt 24, as shown in FIG. 9B. That is, the tip of the socket 16c and the head portion 26 of the bolt 24 are in linear contact or surface contact with each other. Furthermore, in the case of parallel deviation, it is possible to perform the feeling-around operation in which the socket 16c rotates in the direction of the arrow centered on the contact location with the head portion 26 of the bolt 24.

Figure 10A:
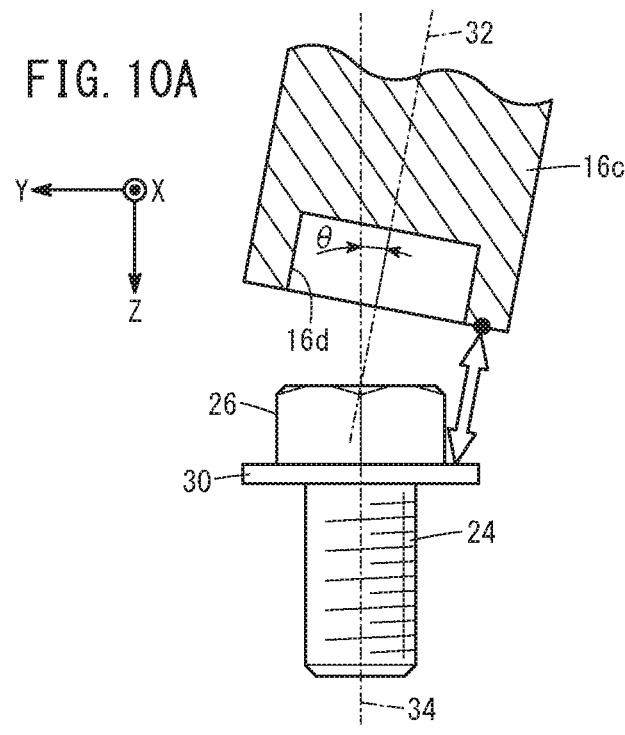
FIG. 10A is a descriptive view of a state before contact between the socket and the bolt when the socket experiences inclination deviation relative to the bolt.
Figure 10B:
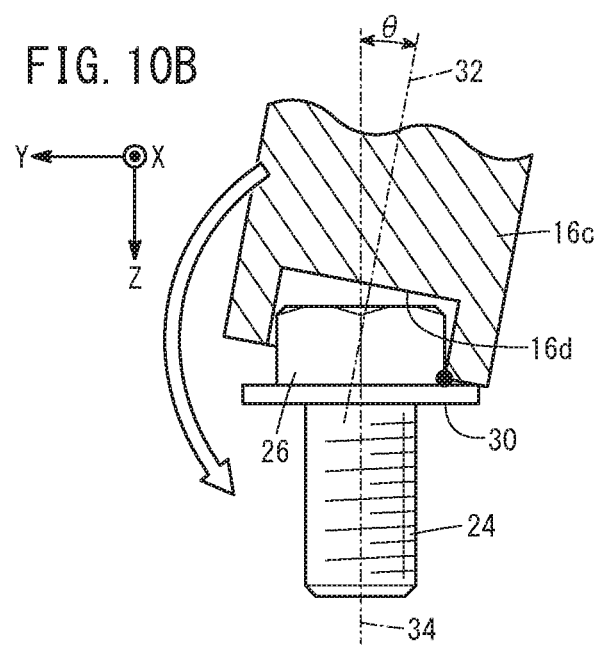
FIG. 10B is a descriptive view of a contact state of the socket and the bolt of FIG. 10A.

FIGS. 10A and 10B show a case in which the central axis 32 of the socket 16c is inclined by an angle θ relative to the central axis 34 of the bolt 24. In the following, a case where one central axis is inclined relative to another central axis is referred to as "inclination deviation". In this case, when the socket 16c is lowered along the Z-axis, a portion of the head portion 26 of the bolt 24 is inserted into the recessed portion 16d of the socket 16c and the tip of the socket 16c contacts the flange 30 of the head portion 26 of the bolt 24, as shown in FIG. 10B. However, the recessed portion 16d of the socket 16c and the head portion 26 of the bolt 24 cannot fit together. In other words, the tip of the socket 16c and the flange 30 of the head portion 26 of the bolt 24 are in point contact or linear contact. Furthermore, in the case of inclination deviation, it is possible to perform the feeling-around operation in which the socket 16c rotates in the direction of the arrow centered on the contact location (location shown by the large dot in FIG. 10B) with the flange 30 of the head portion 26 of the bolt 24.

Figure 11A:
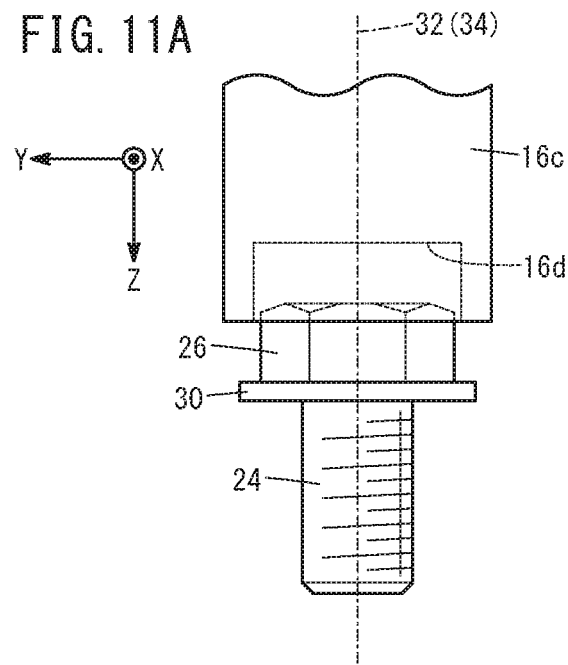
FIG. 11A is a descriptive view of a state before contact between the socket and the bolt when the socket experiences phase deviation relative to the bolt.
Figure 11B:
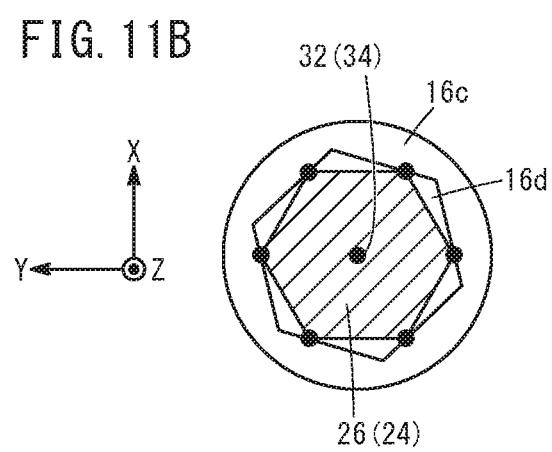
FIG. 11B is a descriptive view of a contact state of the socket and the bolt.

FIGS. 11A and 11B show a case in which there is deviation between the phase of the socket 16c around the central axis 32 and the phase of the bolt 24 around the central axis 34. In the following, a case where there is deviation between the phase of the socket 16c and the phase of the bolt 24 is referred to as "phase deviation". In this case, when the socket 16c is lowered along the Z-axis, part of the head portion 26 of the bolt 24 is inserted into the recessed portion 16d of the socket 16c, and it becomes impossible for the recessed portion 16d of the socket 16c to fit with the head portion 26 of the bolt 24. That is, a state of point contact between the recessed portion 16d of the socket 16c and the six vertices of the head portion 26 of the bolt 24 occurs. In the case of phase deviation, when there is point contact between the recessed portion 16d of the socket 16c and each vertex of the head portion 26 of the bolt 24, it is impossible for the socket 16c to rotate around the central axes 32 and 34 relative to the bolt 24. Incidentally, in the case of phase deviation, if parallel deviation also occurs, this results in a similar situation as in FIGS. 9A and 9B.

Figure 12A:
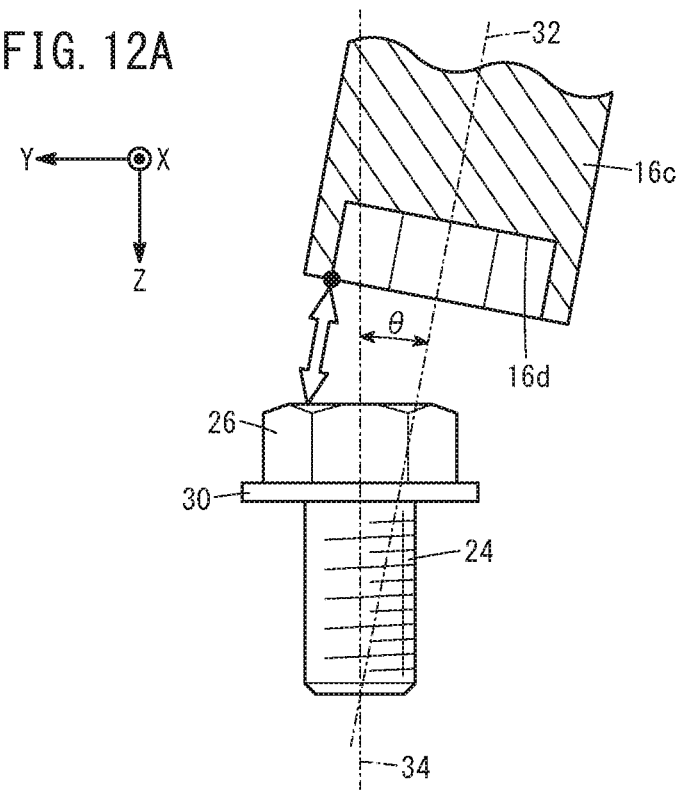
FIG. 12A is a descriptive view of a state before contact between the socket and the bolt when the socket experiences parallel and inclination deviation relative to the bolt.
Figure 12B:
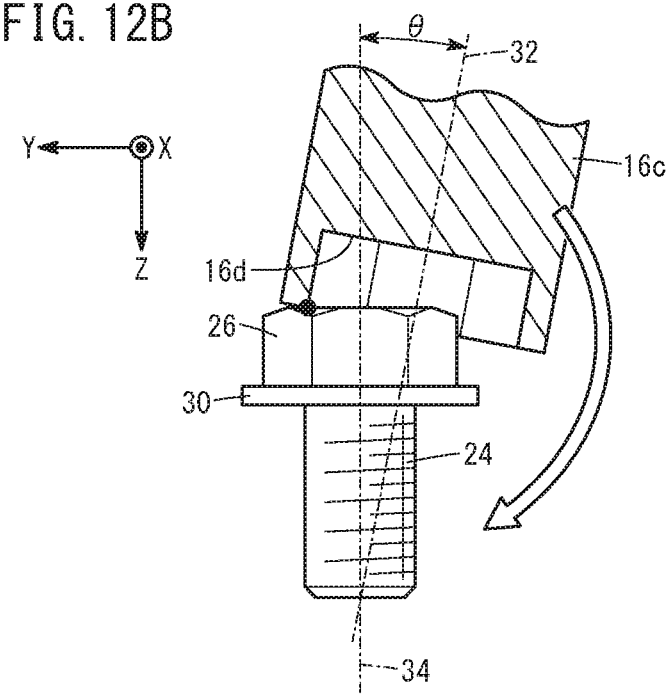
FIG. 12B is a descriptive view of a contact state of the socket and the bolt of FIG. 12A.

FIGS. 12A and 12B show a case in which the central axis 32 of the socket 16c is deviated or displaced in the Y direction relative to the central axis 34 of the bolt 24, and the central axis 32 of the socket 16c is inclined by an angle θ relative to the central axis 34 of the bolt 24. In other words, FIGS. 12A and 12B show a case in which both the parallel deviation shown in FIGS. 9A and 9B and the inclination deviation shown in FIGS. 10A and 10B occur. In the following, this type of deviation is referred to as "parallel and inclination deviation". In this case, when the socket 16c is lowered along the Z-axis, the tip of the socket 16c contacts the head portion 26 of the bolt 24 and the recessed portion 16d of the socket 16c cannot be fitted with the head portion 26 of the bolt 24, as shown in FIG. 12B. That is, there is point contact or linear contact between the tip of the socket 16c and the head portion 26 of the bolt 24. Furthermore, in the case of parallel and inclination deviation, it is possible to perform the feeling-around operation in which the socket 16c rotates in the arrow direction centered on the contact location (location shown by a large dot in FIG. 12B) with the head portion 26 of the bolt 24.

Figure 13:
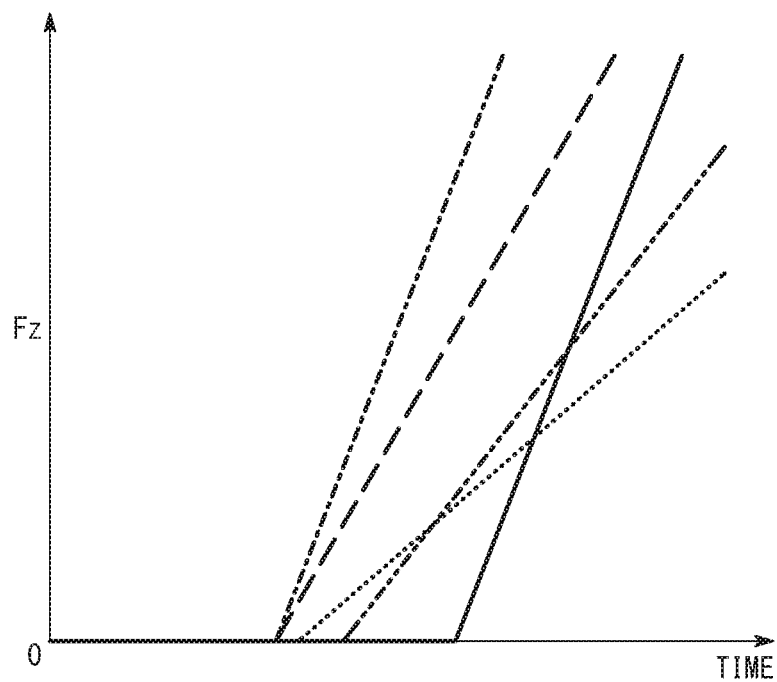
FIG. 13 shows change over time of the contact force between the socket and the bolt from a state before contact to the contact state.

FIG. 13 shows the relationships between the elapsed time from when the socket 16c starts being lowered and the contact force (reaction force) exerted on the bolt 24 by the socket 16c, when the socket 16c is lowered relative to the bolt 24, in each of the cases shown in FIGS. 8A to 12B. The contact force of FIG. 13 is the Z-direction component (contact force Fz) of the reaction force received by the socket 16c from the bolt 24, for example. Here, the elapsed time (stroke) from the timing at which the socket 16c starts being lowered to when the socket 16c contacts (touches) the head portion 26 of the bolt 24 is referred to as the arrival travel time.

As shown in FIG. 13, in every case, the contact force Fz is at a level of approximately 0 until the arrival travel time has passed, and then, after the arrival travel time has passed, increases linearly over time. However, the change over time (slope) of the contact force Fz after the arrival travel time has passed has a characteristic of differing according to the type of deviation.

Specifically, in a case where no deviation occurs (see FIGS. 8A and 8B), as shown by the solid line in FIG. 13, the arrival travel time is longest when compared to the cases where the various types of deviation occur (see FIGS. 9A to 12B). That is, this is because, in a case where no deviation occurs, the travel distance of the socket 16c until reaching the head portion 26 of the bolt 24 is longest. Accordingly, in the cases of the parallel deviation shown by the dashed line (see FIGS. 9A and 9B), the inclination deviation shown by the two-dot chain line (see FIGS. 10A and 10B), the phase deviation shown by the one-dot chain line (see FIGS. 11A and 11B), and the parallel and inclination deviation shown by the dotted line (see FIGS. 12A and 12B), the arrival travel time is shorter than in the case where there is no deviation.

Therefore, with FIG. 13, it is possible to identify the type of deviation and understand the characteristics of each type of deviation by comparing the arrival travel time and the slope of the contact fore Fz. For example, by comparing the differences in the arrival travel time between the case where deviation does not occur (solid line in FIG. 13) and the case where there is phase deviation (one-dot chain line in FIG. 13), it is possible to distinguish between these cases. Furthermore, by comparing the slope of the contact force Fz between the case where there is parallel deviation (dashed line in FIG. 13) and the case where there is phase deviation (one-dot chain line in FIG. 13), it is possible to distinguish between these cases. Yet further, the case where there is inclination deviation (two-dot chain line in FIG. 13) can be distinguished from other results based on the differences in the arrival travel time and the slope of the contact force Fz. The case where there is parallel and inclination deviation (dotted line in FIG. 13) can be distinguished from other results based on being a result in which the slope of the contact force Fz is smallest.

According to the above results, if the characteristics of various deviations are specified in advance, it becomes possible to identify the type of deviation occurring, correct the deviation amount that actually occurs, and correctly fit the socket 16c and the bolt 24 together, based on a comparison between the characteristics of each type of deviation and the contact force Fz exerted on the bolt 24 by the socket 16c detected by the sensor 18 during the assembly work or tightening work (actual work) involving the bolt 24 actually performed by the socket 16c. Furthermore, it is possible to judge whether the socket 16c and the bolt 24 have been fitted together.

Figure 14A:
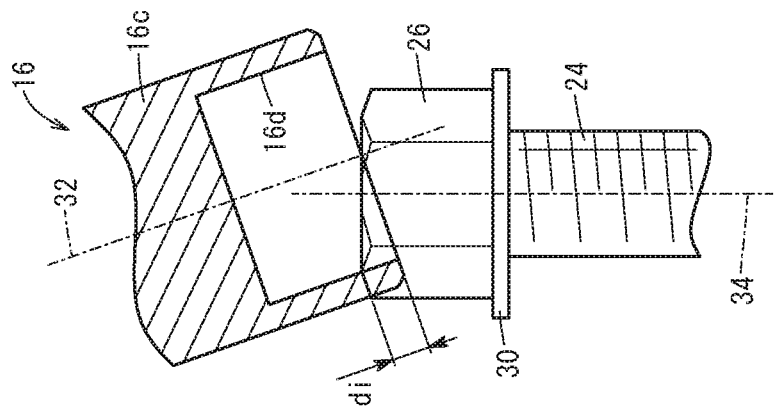
FIGS. 14A, 14B, and 14C are descriptive diagrams showing an example of a feeling-around operation performed for the bolt using the socket.
Figure 14B:
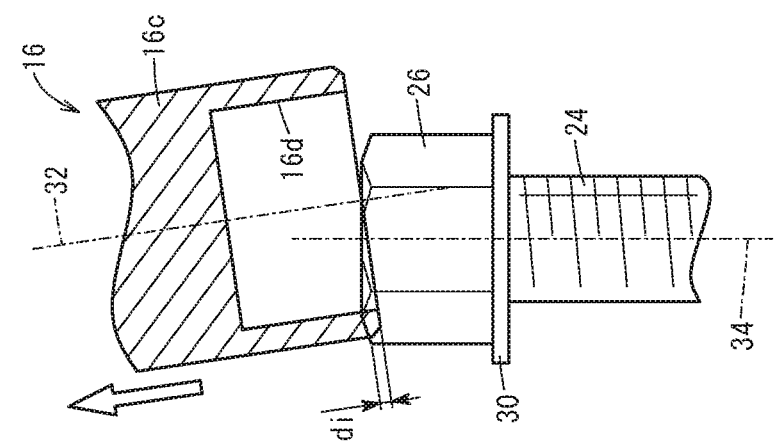
Figure 14C:
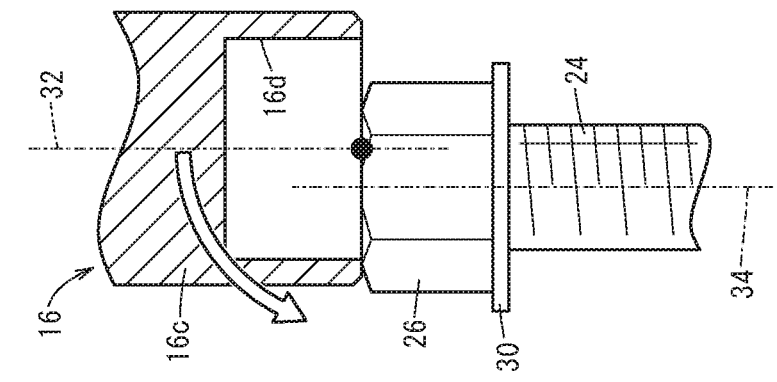

FIGS. 14A to 14C are descriptive diagrams showing the feeling-around operation with the socket 16c relative to the bolt 24, performed by the robot 14. As an example, FIGS. 14A to 14C show a case where there is parallel deviation (see FIGS. 9A and 9B). By controlling the robot 14 in a state where there is contact between the socket 16c and the bolt 24 as shown in FIG. 14A and rotating the socket 16c in a counter-clockwise direction within the plane of FIG. 14A centered on the contact location shown by a large dot, the states shown in FIGS. 14B and 14C are realized. In this case, the space between the top end of the head portion 26 of the bolt 24 and the bottom end of the socket 16c becomes an interference allowance di between the socket 16c and the bolt 24.

Since the robot system 10 includes the linear movement mechanism 27 or 29 (see FIGS. 4 to 7), the spring 27j or 29e contracts by an amount corresponding to the interference tolerance di, and this amount is converted into the stroke amount of the socket 16c or the nut runner 16 in the Z direction. In this way, when the socket 16c is rotated according to the feeling-around operation, the linear movement mechanism 27 or 29 moves the socket 16c or nut runner 16 linearly in the Z direction according to the value of the contact force Fz, and therefore it is possible to reduce the load of the socket 16c.

Furthermore, the contact force Fz is transmitted to the sensor 18 mounted on the nut runner support member 20, via the spring 27j or 29e, the nut runner support member 20, and the like. In this way, the sensor 18 can easily sense the contact force Fz even when the sensor 18 is not coaxial with the central axis 32 of the socket 16c. In the robot system 10, the type of deviation is not limited to the parallel deviation described above, and in a case where another type of deviation (see FIGS. 10A to 12B) occurs as well, it is possible to reduce the load of the socket 16c and sense the contact force Fz when the feeling-around operation is performed.

Figure 15:
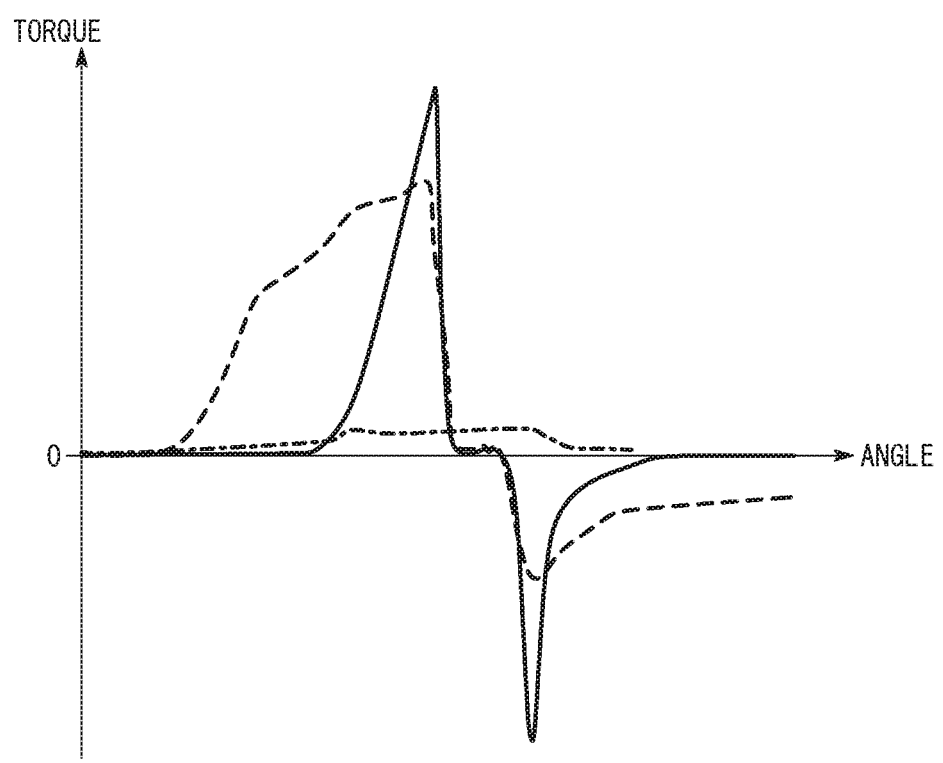
FIG. 15 shows change in the torque acting on the socket when the bolt is assembled or tightened.

FIG. 15 shows a relationship between the torque acting on the socket 16c and a rotational angle $\varphi$ occurring when the socket 16c is rotated around the central axis 32 to tighten the bolt 24 onto the target object 28. In this case, the rotational angle $\varphi$ is an angle corresponding to time. The solid line is a result obtained when the socket 16c has been rotated in a state where the central axes 32 and 34 are substantially coaxial (see FIG. 8B). The dashed line is a result obtained when the socket 16c has been rotated in a state where parallel deviation (see FIG. 9B) and/or biting occur. The one-dot chain line is a result obtained when the socket 16c has been rotated in a state where the socket 16c does not contact the bolt 24.

In the case of the result shown by the solid line in FIG. 15, it is possible to correctly tighten the bolt 24 using the socket 16c. Accordingly, by making a comparison between the correct result shown by the solid line and the result of the actual tightening operation, it is possible to sense whether there is deviation and whether there is an abnormality in the assembly work or tightening work.

Figure 16:
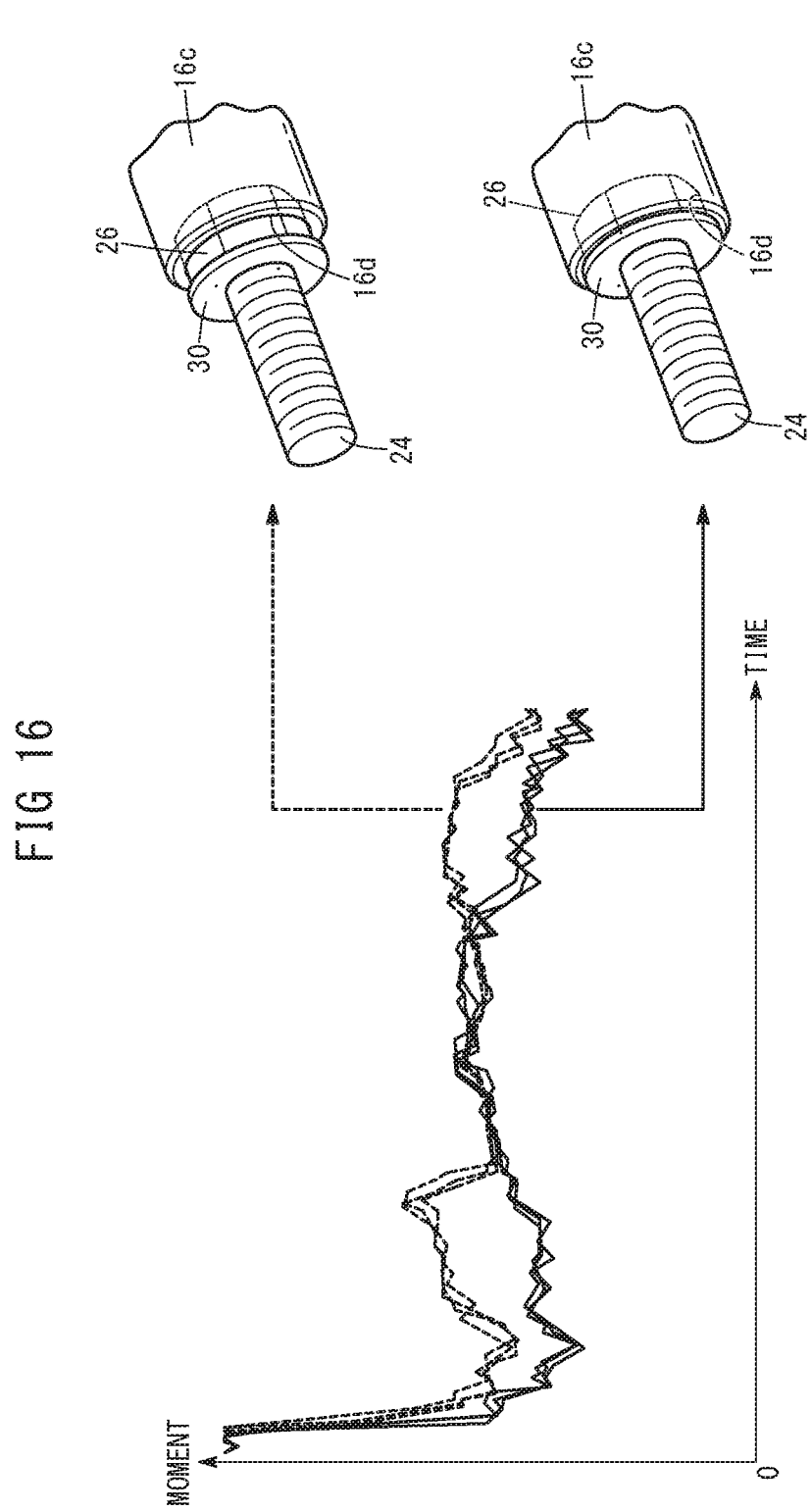
FIG. 16 shows change over time of a moment acting on the socket when the bolt is assembled or tightened.

FIG. 16 shows change over time of the moment acting on the socket 16c when the bolt 24 is tightened using the socket 16c. The solid line is a result obtained in a state where the socket 16c and the bolt 24 are fitted together, and the dashed line is a result obtained in a state where phase deviation occurs (see FIGS. 11A and 11B). In the case of the result shown by the solid line of FIG. 16, it is possible to correctly tighten the bolt 24 using the socket 16c. Accordingly, by making a comparison between the correct result shown by the solid line and the result of the actual tightening operation, it is possible to recognize whether the socket 16c and the bolt 24 are in the correct contact state.

[3. Operation of the Present Embodiment]

The following describes the operation of the robot system 10 (control method of the robot 14) according to the present embodiment in which the findings described above are applied, while referencing FIGS. 17 to 23. In the description of this operation, FIGS. 1 to 16 will also be referenced as needed. The following describes an operation for correcting the deviation amount occurring during the actual work and suitably tightening the bolt 24 on the target object 28. The description involving FIGS. 17 to 23 focuses mainly on a case in which there is inclination deviation and the sensor 18 detects the reaction force (contact force) applied to the bolt 24 by the socket 16c. Furthermore, it should be noted that an operation similar to the operation of FIGS. 17 to 23 is used when assembling the bolt 24 in the target object 28 as well.

Figure 17:
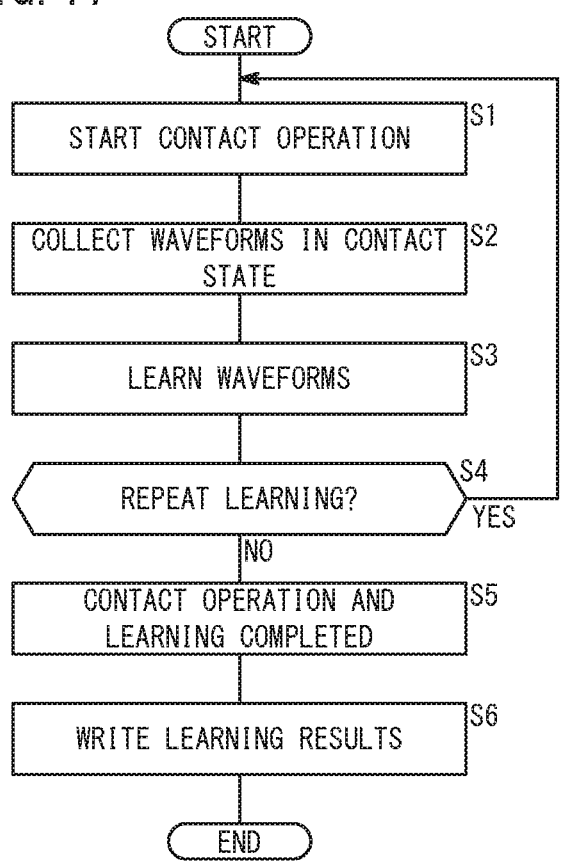
FIG. 17 is a flow chart showing an operation of the robot system shown in FIG. 1 during the learning.

In the robot system 10, the various types of deviation and the like are learned according to the flow of FIG. 17. First, at step S1 in FIG. 17, the learning section 13a of the learning apparatus 13 supplies the robot 14 with a control signal corresponding to the data of the learning conditions, to drive the motor. In this way, by having the robot 14 start the operation and begin lowering the nut runner 16 attached to the end effector attachment portion 14g, the position control of the socket 16c is started. Furthermore, the sensor 18 starts detecting the contact state (e.g. the contact force (reaction force)) between the socket 16c and the bolt 24. The sensor 18 sequentially outputs the detection results to the control apparatus 12. The socket 16c and bolt 24 used in FIG. 17 are the same type as the socket 16c and the bolt 24 used in the actual work described further below.

In this case, a detection result with a level of substantially 0 is sequentially output from the sensor 18 to the control apparatus 12, until the socket 16c contacts the head portion 26 of the bolt 24. Furthermore, the detecting section 12a of the control apparatus 12 measures the time from the timing at which the nut runner 16 starts being lowered, and stores the elapsed time from this lowering start timing in association with the detection results (contact force) from the sensor 18 in a memory (not shown in the drawings).

When the socket 16c contacts the bolt 24, the socket 16c presses on the head portion 26 of the bolt 24, and therefore receives a reaction force from the bolt 24. The nut runner 16 is provided with the linear movement mechanism 27 or 29 that linearly moves the socket 16c or the nut runner 16 in the Z direction, according to the value of the reaction force (contact force). Therefore, even when the socket 16c receives the contact force from the bolt 24, it is possible to reduce the load on this socket 16c.

The sensor 18 detects the contact force transmitted from the nut runner 16 or the linear movement mechanism 27 or 29 via the nut runner support member 20, and sequentially outputs these detection results to the detecting section 12a. The detecting section 12a can recognize that the socket 16c has contacted the bolt 24, from the relationship between the elapsed time and the magnitude of the contact force exerted on the head portion 26 of the bolt 24 by the socket 16c (e.g. the contact force Fz that is the Z-direction component). That is, the detecting section 12a can acquire a result of the change over time of the contact force Fz from the elapsed time and the contact force Fz.

Figure 19:
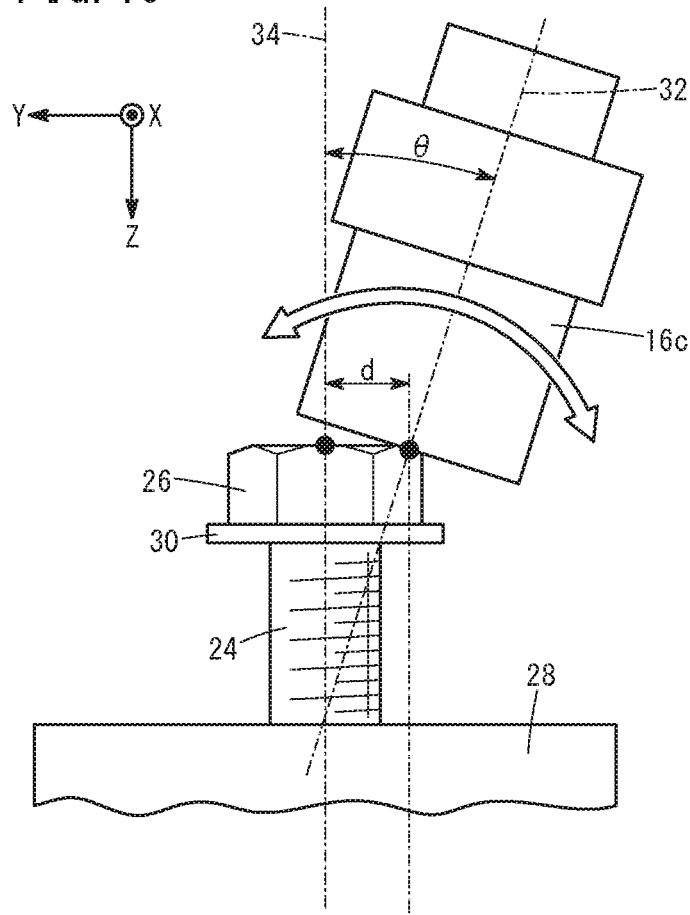
FIG. 19 is a descriptive diagram showing a contact state between the socket and the bolt.

Next, at step S2 (first step), in a state where the socket 16c and the head portion 26 of the bolt 24 are in contact with each other, the learning section 13a controls the robot 14 to perform the feeling-around operation to rotate the socket 16c in the clockwise direction and counter-clockwise direction in the Y-Z plane, centered on the contact position (set position shown by the large dot) between the socket 16c and the head portion 26 of the bolt 24, for example, as shown in FIG. 19. In FIG. 19, d is the space between the central axis 34 and the contact location where the socket 16c contacts the head portion 26 of the bolt 24. In the feeling-around operation of step S2, the order of the directions in which the socket 16c is rotated relative to the set position and the range in which the socket 16c is rotated relative to the set position (set operational range) should be set appropriately. Further, the control section 12b controls the robot 14 to cause the socket 16c to contact the head portion 26 of the bolt 24, such that the contact force does not exceed a prescribed value. The threshold value is an upper limit value for the contact force F that does not cause damage to the bolt 24 (maximum value for the load placed on the bolt 24).

Figure 20:
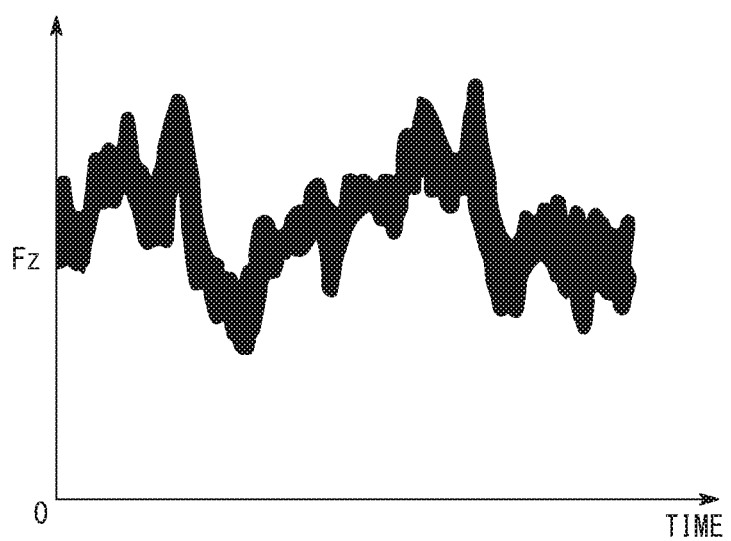
FIG. 20 shows learning waveform data acquired by the learning section during the learning.

In this case as well, the sensor 18 sequentially detects the contact force exerted on the head portion 26 of the bolt 24 by the socket 16c, and outputs these detection results to the control apparatus 12. The detecting section 12a stores the detection results of the sensor 18 sequentially input thereto in a memory, in association with the elapsed time. As a result, the detecting section 12a can collect (detect) the waveform data (learning waveform data) indicating the relationship between the contact force (contact force Fz of the Z-direction component) and the elapsed time such as shown in FIG. 20. The detecting section 12a then supplies the detected learning waveform data to the learning section 13a. Since the socket 16c performs the feeling-around operation of rotating in the clockwise direction and the counter-clockwise direction centered on the set position, the elapsed time, which is the horizontal axis of the learning waveform data, corresponds to the angle θ of the bolt 24 relative to the central axis 32.

Next, at step S3 (second step), the learning section 13a learns the collected learning waveform data, through deep learning. In this case, the learning section 13a learns the characteristics of the learning waveform data, that is, the characteristics of the change over time of the contact force Fz caused by the deviation (trend of the waveform shown in FIG. 20), using a widely known neural network. Since deep learning techniques are widely known, a detailed description thereof is omitted.

Next, at step S4, the learning section 13a judges whether to repeat the deep learning of the learning waveform data. If the learning of the waveform corresponding to each type of deviation envisioned for the actual work is not completed, the learning section 13a judges that further learning is necessary (step S4; YES). The learning section 13a then returns to step S1 and performs the feeling-around process for performing further learning.

As shown in FIGS. 13, 15, and 16, the change over time (slope) of the contact force Fz, the change of torque, and the change over time of the moment each differ according to the type of the deviation. Therefore, by repeating the processing of steps S1 to S4, the learning section 13a can learn with certainty the characteristics of waveforms for the same deviation and the characteristics of waveforms for different types of deviation. In other words, the learning section 13a can learn the characteristics corresponding to each type of deviation by repeatedly performing the processing of step S1 to S4 for each type of deviation.

FIG. 20 shows a plurality of pieces of learning waveform data obtained by repeatedly performing the processing of steps S1 to S4 and superimposed on each other. Furthermore, in the present embodiment, by changing the set position on the surface of the head portion 26 of the bolt 24 and performing the processing of step S1 to S4, it is possible to acquire the learning waveform data for each of the plurality of set positions and learn the characteristics of the deviations with the learning section 13a. Furthermore, in the present embodiment, by repeatedly performing the processing of step S1 to S4, the detecting section 12a can detect the results of FIGS. 13, 15, and 16 as the learning waveform data and the learning section 13a can learn this learning waveform data.

On the other hand, if it is judged that a sufficient amount of learning of the waveforms corresponding to each type of deviation envisioned for the actual work has been performed (step S4: NO), the learning section 13a proceeds to the following step S5. At step S5, the learning section 13a ends the deep learning using the learning waveform data and instructs the robot 14 to end the contact operation of causing contact between the socket 16c and the bolt 24. In this way, the robot 14 withdraws the nut runner 16 upward to move the socket 16c away from the head portion 26 of the bolt 24.

Figure 18:
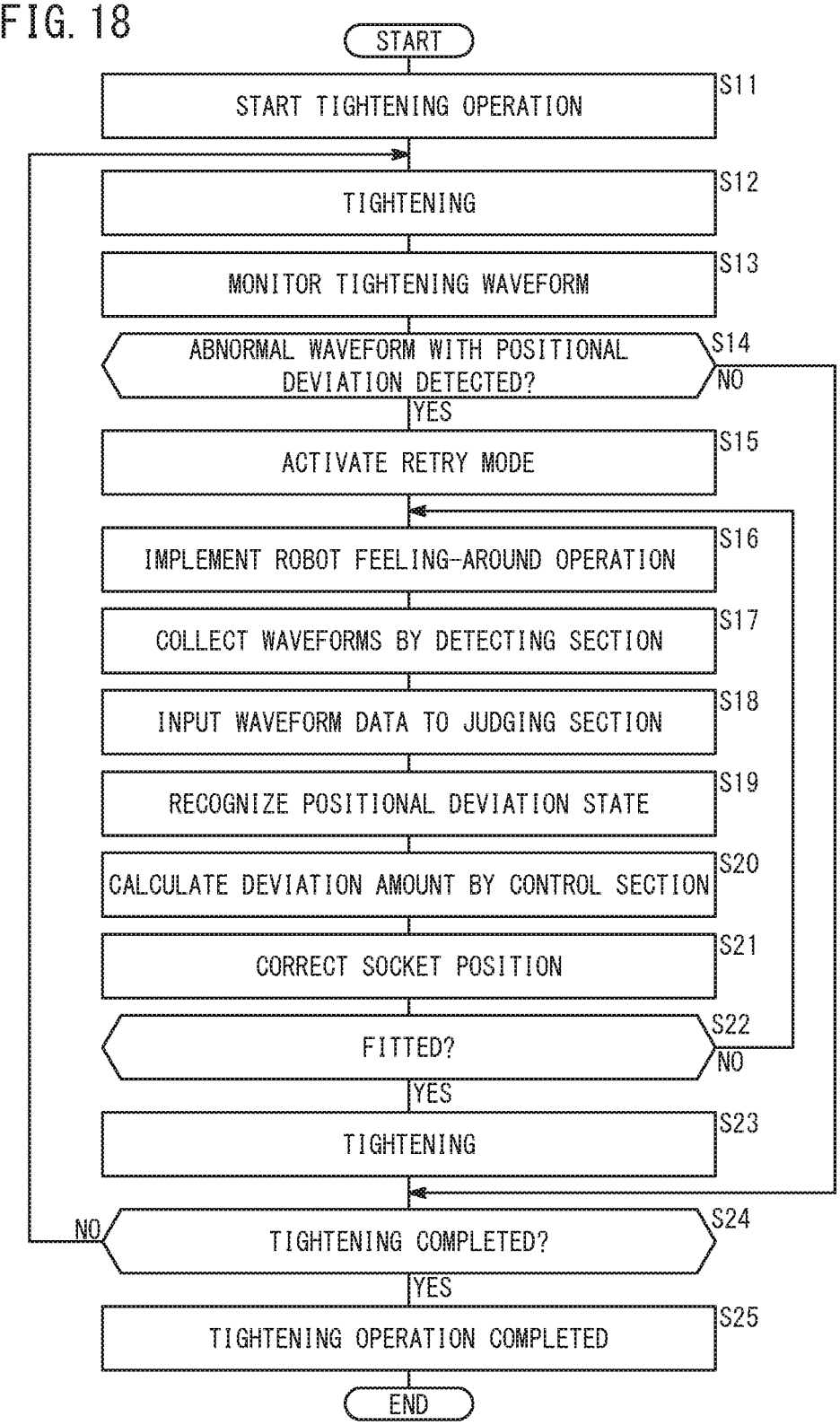
FIG. 18 is a flow chart showing an operation of the robot system shown in FIG. 1 during the actual work.
Figure 21:
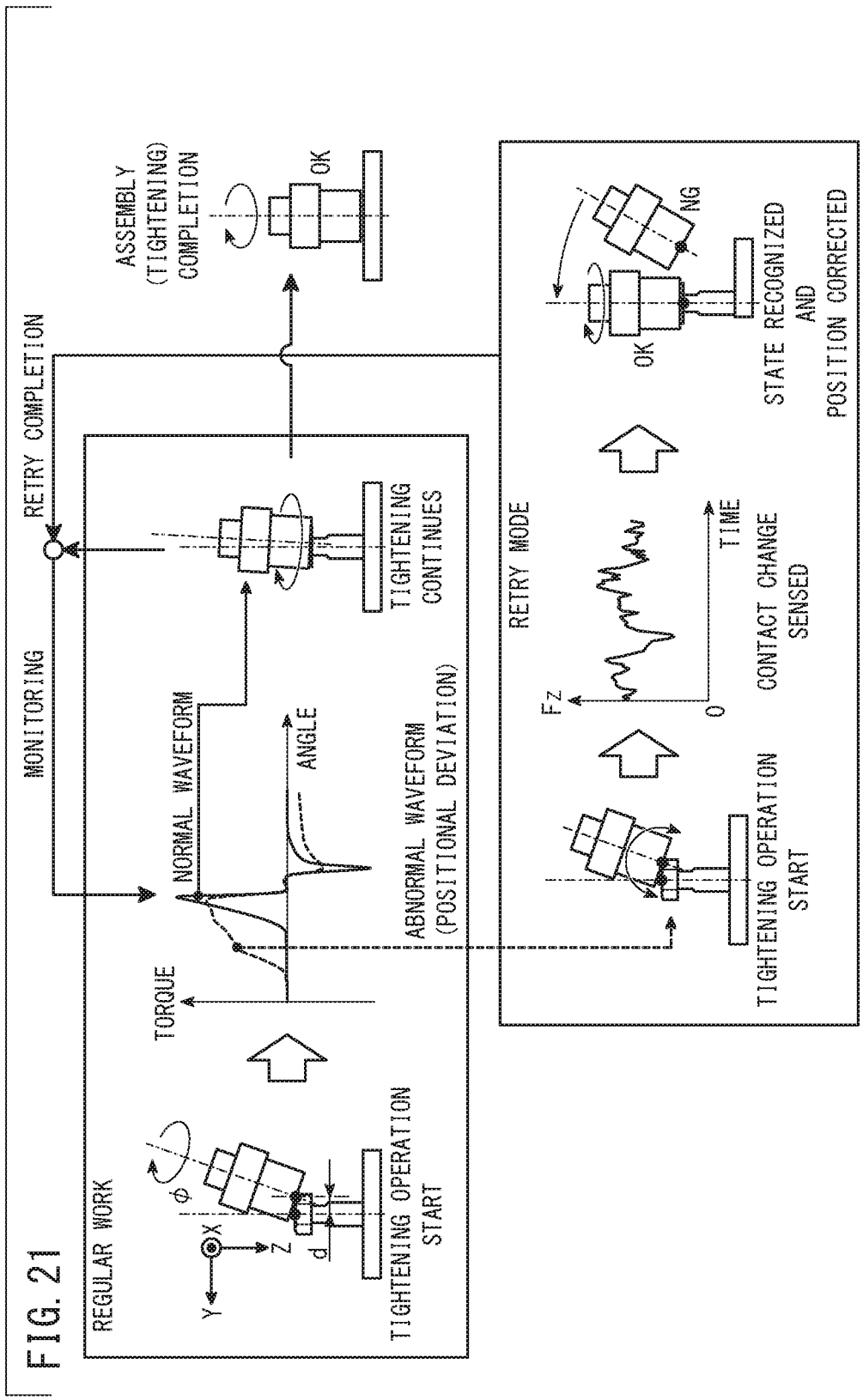
FIG. 21 is a descriptive diagram schematically showing a flow of an operation of the robot system during the actual work.
Figure 22:
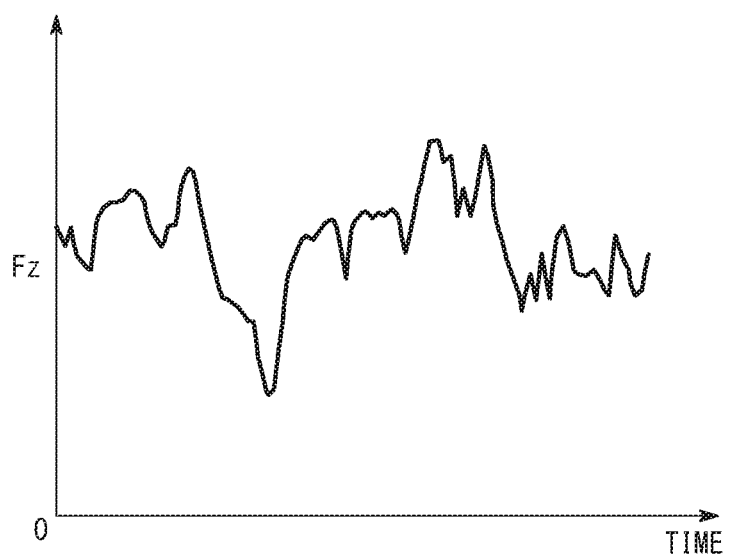
FIG. 22 shows actual waveform data acquired by the learning section during the actual work.

After the learning waveform data is collected and the characteristics of the waveforms are learned in advance in this way, at step S6 (third step), the learning section 13a writes the learning results of the plurality of pieces of learning waveform data to the judging section 12c. After this, in the robot system 10, the actual work shown in the flow chart of FIG. 18 is performed. FIG. 21 is a descriptive diagram showing an outline of the process of the actual work, and generally corresponds to each step of FIG. 18.

At step S11 of FIG. 18, the control section 12b starts the tightening operation of the bolt 24 using the socket 16c, by controlling the robot 14 to lower the nut runner 16 and cause the socket 16c to contact the head portion 26 of the bolt 24. In this way, at the following step S12, the drive portion 16a of the nut runner 16 provides drive so that the shaft 16b and the socket 16c rotate around the central axis 32 to tighten the bolt 24 onto the target object 28.

Next, at step S13, the detecting section 12a collects (detects) the waveform data (actual waveform data) of the torque acting on the socket 16c shown in FIG. 15. The detecting section 12a can calculate the torque using the moment component detected by the sensor 18. The detected actual waveform data is supplied to the judging section 12c.

Next, at step S14, the judging section 12c judges whether the actual waveform data is an abnormal waveform having some kind of deviation, based on the supplied actual waveform data and the learning results of the learning waveform data concerning the torque among the learning results written beforehand. In this case, if the actual waveform data is the waveform data shown by the dashed line in FIG. 15, for example, the judging section 12c judges that this is an abnormal waveform (step S14: YES), the process moves to step S15.

Next, at step S15, since the waveform is abnormal, the judging section 12c activates a retry mode to correct the deviation of the socket 16c relative to the bolt 24 and realize the correct tightening state.

In the retry mode, at step S16, the control section 12b controls the robot 14 based on the judgment result of the judging section 12c to perform the feeling-around operation with the socket 16c relative to the bolt 24. In this case, a feeling-around operation similar to that of step S2 in FIG. 17 may be performed.

In this way, at step S17, the sensor 18 senses the contact state between the socket 16c and the bolt 24, and sequentially outputs these sensing results to the detecting section 12a. As a result, the detecting section 12a can detect the actual waveform data indicating the relationship between the contact force Fz and the time shown in FIG. 22. The detecting section 12a then supplies the detected actual waveform data to the judging section 12c.

When the actual waveform data has been supplied to the judging section 12c at step S18 (fourth step), next, at step S19, the judging section 12c recognizes the contact state between the socket 16c and the bolt 24 shown by the actual waveform data, that is, the deviation of the socket 16c relative to the bolt 24, and identifies the type of deviation, based on the supplied actual waveform data and the learning results of the learning waveform data (see FIG. 20) concerning the contact force among the learning results written beforehand. The recognition result (judgment result) for this deviation obtained by the judging section 12c is supplied to the control section 12b.

Next, at step S20 (fifth step), the control section 12b calculates (estimates) the deviation amount of the socket 16c relative to the bolt 24, based on the recognition result (judgment result) of step S19. Next, at step S21, by controlling the robot 14 using the estimated deviation amount as the control amount, the control section 12b corrects the deviation amount such that the central axis 32 of the socket 16c and the central axis 34 of the bolt 24 become substantially coaxial, as shown in FIGS. 21 and 23.

Next, at step S22, the judging section 12c judges whether the socket 16c and the bolt 24 have fitted together as a result of the correction of the position of the socket 16c made in step S21. In this case, as an example, actual waveform data as shown in FIG. 13 is detected by the detecting section 12a, and the judging section 12c may judge whether fitting of the socket 16c and bolt 24 has been realized based on the detected waveform data and the learning result of the learning waveform data corresponding to FIG. 13.

If it is judged that the socket 16c and the bolt 24 are not fitted together (step S22: NO), the process returns to step S16 and the retry mode continues to be performed. On the other hand, if it is judged that the socket 16c and the bolt 24 are fitted together (step S22: YES), the process moves to step S23, where the judging section 12c ends the retry mode and notifies the control section 12b of the judgment result of step S22. The control section 12b rotates the shaft 16b and the socket 16c to perform the tightening work on the bolt 24, by controlling the nut runner 16.

If the target object 28 and the bolt 24 are screwed together and the tightening of the bolt 24 is completed (step S24: YES), at step S25, the control section 12b stops the driving of the nut runner 16 and controls the robot 14 to withdraw the nut runner 16 upward, thereby moving the socket 16c away from the head portion 26 of the bolt 24. In this way, the series of tightening operations performed on the bolt 24 is finished. Concerning the judgment about completion of the tightening of the bolt 24 made in step S24, the tightening may be judged to be completed if the contact force detected by the sensor 18 has reached a prescribed value or if a prescribed time has passed from the start of the tightening work, for example.

If it is judged that the tightening of the bolt 24 in step S24 has not been completed (step S24: NO), the process returns to step S12, and the processing from step S12 and onward is performed again. Furthermore, if the actual waveform data is not an abnormal waveform at step S14 (step S14: NO), the judging section 12c judges that the socket 16c and the bolt 24 fit together, skips the processing of step S15 to S23, and performs the processing of step S24.

In this way, with the operation described above, the retry mode of steps S15 to S22 is activated to perform the deviation correction only in the case of abnormal actual waveform data indicating the occurrence of deviation in step S14, and therefore it is possible to increase the success rate of the tightening of the bolt 24 while minimizing the effect on the cycle time.

In the above description of the operation, a case is described in which there is inclination deviation (see FIGS. 10A and 10B). On the other hand, in the case of parallel deviation (see FIGS. 9A and 9B), at step S21, the robot 14 should be controlled to move the socket 16c in parallel in the X direction or Y direction such that the two central axes 32 and 34 become substantially coaxial. Furthermore, in the case of phase deviation (see FIGS. 11A and 11B), at step S21, the nut runner 16 should be controlled to rotate the socket 16c around the central axis 32 such that the recessed portion 16d of the socket 16c and the head portion 26 of the bolt 24 have the same phase. Yet further, in the case of parallel and inclination deviation (see FIGS. 12A and 12B), at step S21, the two central axes 32 and 34 should be corrected to be substantially coaxial by applying a deviation amount correction method to the inclination deviation and the parallel deviation.

[4. Effect of the Present Embodiment]

As described above, according to the robot system 10 and the control method for the robot 14 of the present embodiment, even when the deviation amount of the socket 16c mounted on the shaft 16b of the nut runner 16 relative to the bolt 24 is a deviation amount in multidimensional directions, it is possible to recognize the deviation of the socket 16c relative to the bolt 24 based on the change in the contact state between the socket 16c and the bolt 24 detected by a single sensor 18 and to estimate the deviation amount based on this recognition result (judgment result). Accordingly, in the present embodiment, it is possible to estimate the deviation amount using a system configuration that is simpler than the widely known technology described above. As a result, it is possible to build a system with a high degree of mountability at low cost.

Since the learning waveform data is logging data of a one-dimensional change over time, it is easier to handle the acquired data concerning the change of the contact state than in the widely known technology described above. As a result, it is possible to recognize the contact state (deviation) and to control the robot 14 and/or nut runner 16 using this recognition result (judgment result) with a general FA device, without using a specialized computer (PC). Therefore, it is possible to achieve a high system operation rate.

Furthermore, by having the robot 14 perform the feeling-around operation with the socket 16c relative to a plurality of set positions of the bolt 24 using a technique that is similar to feeling-around work performed manually, the learning section 13a learns a plurality of pieces of learning waveform data and, furthermore, the judging section 12c recognizes the deviation based on these learning results and the change in the contact state (actual waveform data) acquired during the actual work. In this way, it is possible to easily estimate the deviation amount with the control section 12b. As a result, compared to the technology described in Japanese Laid-Open Patent Publication No. 2015-155126, robustness with respect to tolerance of the bolt 24, variation in the installation layout of the bolt 24, and disturbances such as rattling of the bolt 24 is improved.

Yet further, in the present embodiment, by repeatedly performing the acquisition of the learning waveform data in the set operational range and the learning of this learning waveform data, using a learning function realized by artificial intelligence, it is possible to autonomously acquire the characteristics of the contact state, recognize the deviation, and estimate the deviation amount. Therefore, it is possible to reduce the number of steps needed to develop and adjust the judgment logic for estimating this deviation amount. As a result, it is possible to shorten the introduction period of the robot system 10.

In this way, in the present embodiment, it is possible to realize the robot system 10 and the robot 14 control method that have higher versatility and lower cost than in the widely known technology described above.

Here, during the actual work, the detecting section 12a detects, as the actual waveform data, the change in the contact state sensed by the sensor 18 when the socket 16c has been brought into contact with any location on the surface of the bolt 24 and the change in the contact state sensed by the sensor 18 when the feeling-around operation is performed with the socket 16c within an operational range relative to the above position. In this way, the judging section 12c recognizes the deviation of the socket 16c relative to the bolt 24 based on the detected actual waveform data and the learning results of the learning waveform data that resembles this actual waveform data that is included in the written learning results. As a result, it is possible to accurately estimate the deviation amount with the control section 12b. Accordingly, in the present embodiment, it is possible to easily build a recognition and judgment processing system for estimating the deviation amount.

Furthermore, the plurality of pieces of learning waveform data have characteristics that differ according to the type of deviation of the socket 16c relative to the bolt 24. Therefore, the learning section 13a learns the characteristics that differ according to the type of deviation for the plurality of pieces of learning waveform data. During the actual work, the judging section 12c identifies the type of deviation corresponding to the actual waveform data, by judging the contact state indicated by the actual waveform data using the learning results. In this way, the judging section 12c recognizes the deviation of the socket 16c relative to the bolt 24, using the actual waveform data and the learning results of the learning waveform data corresponding to the identified deviation type, which is included in the written learning results. As a result, it is possible to even more accurately estimate the deviation amount with the control section 12b.

Furthermore, it is possible to bring the socket 16c into contact with the bolt 24 without damaging the bolt 24, by controlling the robot 14 and/or the nut runner 16 with the control section 12b or causing the socket 16c or nut runner 16 to move within the movable range (range of the contraction amount of the spring 27j or 29e) using the linear movement mechanism 27 or 29, such that the contact state between the socket 16c and the bolt 24 does not exceed a threshold value.

Since the sensor 18 is a touch sensor mounted in the vicinity of the nut runner 16 on the robot 14, it is possible to easily detect the change in the contact state and to improve the durability of the sensor 18 while further lowering the cost.

In this case, the sensor 18 may be mounted on the robot 14 substantially coaxially with the central axis 32 or mounted on the robot 14 in a state where the axis of this sensor 18 is not coaxial with the central axis 32. If the axis of the sensor 18 is not coaxial with the central axis 32, the nut runner 16 is mounted on the robot 14 via the sensor 18. In either case, it is possible to easily detect the change in the contact state.

Furthermore, in the present embodiment, the bolt 24 is assembled or tightened using the socket 16c, and therefore it is possible to easily correct the deviation amount in the assembly work or tightening work involving the target object 28 and the bolt 24.

The present invention is not limited to the embodiments described above, and it is obvious that various configurations can be adopted based on the content described in this specification.

What is claim is:

1. A robot system configured to, when a sensor has sensed a change in a contact state between an end effector of a robot and a workpiece, estimate a deviation amount of the end effector relative to the workpiece based on the change in the contact state sensed by the sensor and correct the deviation amount by controlling the robot and/or the end effector, the robot system comprising:
a control section configured to control the robot and/or the end effector;
a detecting section configured to detect data indicating change over time of the contact state when the contact state between the end effector and the workpiece has been changed by the control section;

a learning section configured to learn the data; and a judging section configured to judge the contact state between the end effector and the workpiece during actual work performed on the workpiece by the end effector, using learning results of the data obtained by the learning section, wherein the detecting section detects in advance, as learning data, a change in the contact state sensed by the sensor, for each of a plurality of set positions on a surface of the workpiece, when the end effector has been caused to contact the set position and a change in the contact state sensed by the sensor when the end effector has been caused to perform a feeling-around operation within a set operational range relative to the set position, the learning section learns a plurality of pieces of the detected learning data and writes learning results of the plurality of pieces of learning data to the judging section, the judging section, during the actual work, acquires the change in the contact state detected by the sensor when the end effector has contacted the surface of the workpiece and, based on the acquired change in the contact state and the written learning results, recognizes a deviation of the end effector relative to the workpiece, and the control section estimates the deviation amount based on a judgment result of the judging section.

2. The robot system according to claim 1, wherein the detecting section, during the actual work, detects, as actual data, the change in the contact state sensed by the senor when the end effector has contacted an arbitrary position on the surface of the workpiece and the change in the contact state sensed by the sensor when the end effector has been caused to perform the feeling-around operation within an arbitrary operational range relative to the arbitrary position, and the judging section recognizes the deviation of the end effector relative to the workpiece, based on the detected actual data and the learning results of the learning data that resembles the actual data and which is included in the written learning results.

3. The robot system according to claim 2, wherein the plurality of pieces of learning data have characteristics that differ according to a type of deviation of the end effector relative to the workpiece, the learning section learns the characteristics that differ according to the type of deviation, for the plurality of pieces of learning data, and the judging section, during the actual work, identifies the type of deviation corresponding to the actual data by judging the contact state indicated by the actual data, using the learning results, and recognizes the deviation of the end effector relative to the workpiece using the actual data and the learning result of the learning data corresponding to the identified type of deviation, which is included in the written learning results.

4. The robot system according to claim 1, wherein the end effector is caused to contact the workpiece by controlling the robot and/or the end effector with the control section or causing the end effector to move within a movable range using an external force movable mechanism, so that the contact state between the end effector and the workpiece does not exceed a threshold value.

5. The robot system according to claim 1, wherein the sensor is a touch sensor mounted in a vicinity of the end effector on the robot.

6. The robot system according to claim 5, wherein the touch sensor is mounted on the robot so as to be substantially coaxial with a central axis of the end effector, or is mounted on the robot in a state where an axis of the touch sensor is not coaxial with the central axis, and if the axis of the touch sensor is not coaxial with the central axis, the end effector is mounted on the robot via the touch sensor.

7. The robot system according to claim 1, wherein the workpiece is a member assembled on a target object or a member tightened to the target object, and the end effector is a tool configured to assemble the member on the target object or a tool configured to tighten the member to the target object.

8. A robot control method for, when a sensor has sensed a change in a contact state between an end effector of a robot and a workpiece, estimating a deviation amount of the end effector relative to the workpiece based on the change in the contact state sensed by the sensor and correcting the deviation amount by controlling the robot and/or the end effector, the robot control method comprising:

a first step of detecting, as learning data, with a detecting section, a change in the contact state sensed by the sensor for a set position on a surface of the workpiece when the end effector has been caused to contact the set position and a change in the contact state sensed by the sensor when the end effector has been caused to perform a feeling-around operation within a set operational range relative to the set position;

a second step of learning, with a learning section, the detected learning data;

a third step of, after the first step and the second step have been repeatedly performed in order, writing learning results of a plurality of pieces of the learning data obtained by the learning section to a judging section;

a fourth step of, during actual work performed on the workpiece by the end effector, acquiring, with the judging section, the change in the contact state detected by the sensor when the end effector has contacted the surface of the workpiece and, based on the acquired change in the contact state and the written learning results, recognizing a deviation of the end effector relative to the workpiece; and a fifth step of estimating, with a control section, the deviation amount based on a judgment result of the judging section.

* * * * *